(12) United States Patent
Ushigome

(10) Patent No.: US 8,520,304 B2
(45) Date of Patent: Aug. 27, 2013

(54) DIFFRACTIVE OPTICAL ELEMENT AND OPTICAL SYSTEM INCLUDING THE SAME

(75) Inventor: Reona Ushigome, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 122 days.

(21) Appl. No.: 13/178,052

(22) Filed: Jul. 7, 2011

(65) Prior Publication Data

US 2012/0008209 A1    Jan. 12, 2012

(30) Foreign Application Priority Data

Jul. 7, 2010 (JP) .................................. 2010-154704

(51) Int. Cl.
*G02B 5/18* (2006.01)

(52) U.S. Cl.
USPC .......................................... 359/576; 359/569

(58) Field of Classification Search
USPC .................. 359/566, 569, 571, 574, 576, 570
See application file for complete search history.

(56) References Cited

U.S. PATENT DOCUMENTS

| | | | |
|---|---|---|---|
| 2008/0231956 A1* | 9/2008 | Yasui | 359/576 |
| 2009/0231712 A1* | 9/2009 | Ushigome | 359/569 |

FOREIGN PATENT DOCUMENTS

| | | | |
|---|---|---|---|
| JP | 2004-078166 A | 3/2004 | |
| JP | 2008-241734 A | 10/2008 | |

* cited by examiner

*Primary Examiner* — Hung Dang
*Assistant Examiner* — Marin Pichler
(74) *Attorney, Agent, or Firm* — Rossi, Kimms & McDowell LLP

(57) ABSTRACT

A diffractive optical element includes a diffraction grating portion including a first diffraction grating and a second diffraction grating, the first diffraction grating and the second diffraction grating being formed of different materials and being stacked so that grating surfaces thereof are in contact with each other, in which the first diffraction grating is formed of a first grating material having at least three kinds of materials mixed therein, and the following conditions are satisfied: $nd1<nd2$; $vd1<vd2$; $\theta gF1<(-1.665E-07\times vd1^3+5.213E-05\times vd1^2-5.656E-03\times vd1+0.715)$; $\theta gF1>(+4.80E-03\times vd1+0.33)$; and $\theta gF1>(-4.73E-02\times vd1+1.31)$, where $nd1$, $vd1$, and $\theta gF1$ represent a refractive index, an Abbe number, and a partial dispersion ratio, respectively, of the first grating material with respect to a d-line, and $nd2$ and $vd2$ represent a refractive index and an Abbe number, respectively, of a second grating material forming the second diffraction grating with respect to the d-line.

20 Claims, 12 Drawing Sheets

DIFFRACTIVE OPTICAL ELEMENT AND OPTICAL SYSTEM INCLUDING THE SAME

BACKGROUND OF THE INVENTION

1. Field of the Invention

The present invention relates to a diffractive optical element and an optical system including the diffractive optical element. For example, the present invention is suitable for optical instruments such as a video camera, a digital camera, a TV camera, a telescope, and binoculars.

2. Description of the Related Art

As opposed to a method of reducing chromatic aberration of a lens system (optical system), by way of combination of glass materials, there has been conventionally known a method of reducing chromatic aberration of a lens system (optical system) by way of the use of a diffractive optical element in which a part of a surface of a lens or a flat plate is provided with a diffraction grating portion (diffractive optical portion) having a diffraction effect.

This method of reducing the chromatic aberration with the use of the diffractive optical element utilizes such a physical phenomenon that the chromatic aberration with respect to a beam having a given reference wavelength occurs in opposite directions between at the refracting surface and at the diffracting surface in an optical system. Further, the diffraction grating portion can have an effect similar to that of an aspherical lens by appropriately changing the period of periodic structure of its diffraction grating. Accordingly, the diffraction grating portion is also effective in reducing various aberrations other than the chromatic aberration. In general, the diffraction grating has blazed structure including grating surfaces and grating side surfaces. The diffraction grating having the blazed structure is capable of efficient beam diffraction with respect to diffracted beams in one particular order (hereinbelow, referred to as "particular order" or "design order") and a particular wavelength.

There is known a diffraction grating portion structured so that the diffraction efficiency in the particular order can be obtained at a sufficiently high level across the entire visible wavelength band. Specifically, two diffraction gratings are arranged in close contact with each other, and, as materials to form the respective diffraction gratings, a material of low refractive index and high dispersion and a material of high refractive index and low dispersion are used. Then, by appropriately setting the height of the diffraction grating, high diffraction efficiency is achieved in a wide wavelength band with respect to diffracted beams in a desired order. Hereinbelow, such a diffraction grating portion is referred to as "contacting two-layer DOE". Here, the "DOE" is an abbreviation for "diffractive optical element". Further, by arranging multiple diffraction gratings in a stacked manner, and also appropriately setting the materials of the respective diffraction gratings and the heights of the respective diffraction gratings, high diffraction efficiency is achieved in a wide wavelength band with respect to the diffracted beams in the desired order. Hereinbelow, such a diffraction grating portion is referred to as "stacked DOE". Note that, the diffraction efficiency is expressed by a ratio of the light quantity of diffracted beams in each order to the light quantity of entire transmitted light fluxes.

In the diffractive optical elements disclosed in Japanese Patent Application Laid-Open No. 2004-78166 and Japanese Patent Application Laid-Open No. 2008-241734, in order to obtain a diffraction efficiency equal to or higher than 99% across the entire visible wavelength range, there is used a material whose partial dispersion ratio $\theta gF$ has a smaller value (linear dispersion characteristic) compared to the normal material.

Of the materials which enable high diffraction efficiency and are thus suitable for forming the diffraction grating, a material in which indium-tin oxide (ITO) nanoparticles are dispersed in a resin is known as a material having the linear dispersion characteristic.

Unlike other inorganic oxides, the refractive index of ITO changes due to free carriers generated by the doping of tin and the holes of oxygen in addition to due to electron transition. Due to the electron transition and the free carriers, ITO has an extremely strong linear dispersion characteristic. By the way, ITO is known as a material having relatively high transmittance and is thus used for transparent electrodes, for example. However, the transmittance of ITO is not sufficient when ITO is used for an optical system which requires transmittance higher than such level. The decrease in transmittance of ITO is caused by the doping of tin. For this reason, a material which is extremely transparent and also has the linear dispersion characteristic is very difficult to obtain.

If a larger amount of the ITO nanoparticles is used as a material for the diffraction grating in an attempt to obtain high diffraction efficiency, the transmittance of the diffraction grating portion becomes lower, and thus application of the diffractive optical element to an optical system becomes unpractical. Conversely, if the mixing ratio of the ITO nanoparticles contained in the material of the diffraction grating is decreased in order to increase the transmittance for the purpose of applying the diffractive optical element to an optical system, high diffraction efficiency becomes difficult to obtain. In addition, the grating portion having a small grating height is difficult to realize. Hence, when the diffractive optical element is applied to an optical system, it is important that the percentage content of the ITO nanoparticles contained in the material of the diffraction grating be made as small as possible, and also that the grating height (grating height) of the grating portion forming the diffraction grating be made small (low).

SUMMARY OF THE INVENTION

The present invention has an object to provide a diffractive optical element which attains high diffraction efficiency and high transmittance with ease, and also enables a grating height of a grating portion of a diffraction grating to be made small, and to provide an optical system including the diffractive optical element.

According to an aspect of the present invention, there is provided a diffractive optical element, including a diffraction grating portion including a first diffraction grating and a second diffraction grating, the first diffraction grating and the second diffraction grating being formed of different materials and being stacked so that grating surfaces thereof are in contact with each other, in which the first diffraction grating is formed of a first grating material having at least three kinds of materials mixed therein, and the following conditions are satisfied:

$$nd1 < nd2;$$

$$vd1 < vd2;$$

$$\theta gF1 < (-1.665E-07 \times vd1^3 + 5.213E-05 \times vd1^2 - 5.656E-03 \times vd1 + 0.715) \theta gF1 > (+4.80E-03 \times vd1 + 0.33);$$
and $$\theta gF1 > (-4.73E-02 \times vd1 + 1.31),$$

where nd1, vd1, and θgF1 represent a refractive index, an Abbe number, and a partial dispersion ratio, respectively, of the first grating material with respect to a d-line, and nd2 and vd2 represent a refractive index and an Abbe number, respectively, of a second grating material forming the second diffraction grating with respect to the d-line.

According to another aspect of the present invention, there is provided a diffractive optical element, including a diffraction grating portion including a first diffraction grating and a second diffraction grating, the first diffraction grating and the second diffraction grating being formed of different materials and being stacked so that grating surfaces thereof are in contact with each other, in which the first diffraction grating is formed of a first grating material having at least three kinds of materials mixed therein, and the following conditions are satisfied:

$$k11>0.001;$$

$$\theta gF11<(-1.665E-07 \times vd11^3+5.213E-05 \times vd11^2-5.656E-03 \times vd11+0.500);$$

$$vd12<30; \text{ and}$$

$$\theta gF12>(-1.665E-07 \times vd12^3+5.213E-05 \times vd12^2-5.656E-03 \times vd12+0.715),$$

where k11, vd11, and θgF11 represent an extinction coefficient, an Abbe number, and a partial dispersion ratio, respectively, of a first material used in the first grating material, and vd12 and θgF12 represent an Abbe number and a partial dispersion ratio, respectively, of a second material used in the first grating material.

According to the present invention, there may be obtained a diffractive optical element which attains high diffraction efficiency and high transmittance with ease, and also enables a grating height of a grating portion of a diffraction grating to be made small.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A diffractive optical element of the present invention includes a diffraction grating portion in which a first diffraction grating and a second diffraction grating, which are formed of different materials, are stacked so that grating surfaces thereof are in contact with each other. A first grating material forming the first diffraction grating is made by mixing three or more kinds of materials. Then, the refractive index, the Abbe number, and the partial dispersion ratio of the first grating material with respect to the d-line are represented by nd1, vd1, and θgF1, respectively, and the refractive index and the Abbe number of a second grating material forming the second diffraction grating with respect to the d-line are represented by nd2 and vd2, respectively. In this case, those parameters are set so as to satisfy predetermined conditional expressions.

Figure 1:
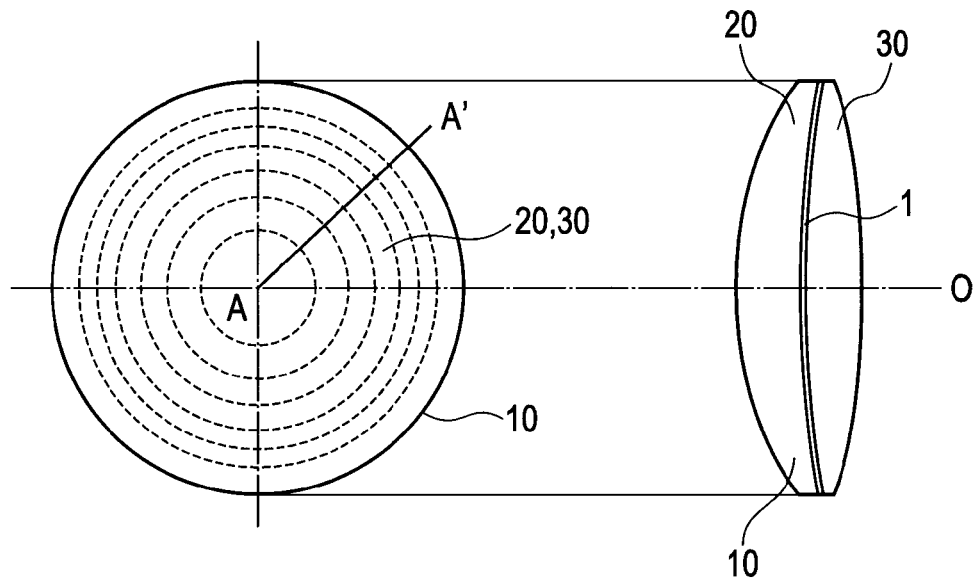
FIG. 1 is a schematic diagram of a main part of a diffractive optical element according to the present invention.

Hereinbelow, exemplary embodiments of the present invention are described in detail with reference to the attached drawings. FIG. 1 illustrates a front view and a side view of the diffractive optical element of the present invention. A diffractive optical element 10 is formed such that a diffraction grating portion (diffractive optical portion) 1 is provided between optical surfaces of substrates (optical substrates) 20 and 30 each formed of a flat plate or a lens. In this embodiment, the surfaces of the substrates 20 and 30 having the diffraction grating portion 1 formed therebetween are each curved. The diffraction grating portion 1 has a concentrical diffraction grating shape with an optical axis O at the center, and provides a lens effect.

Figure 2:
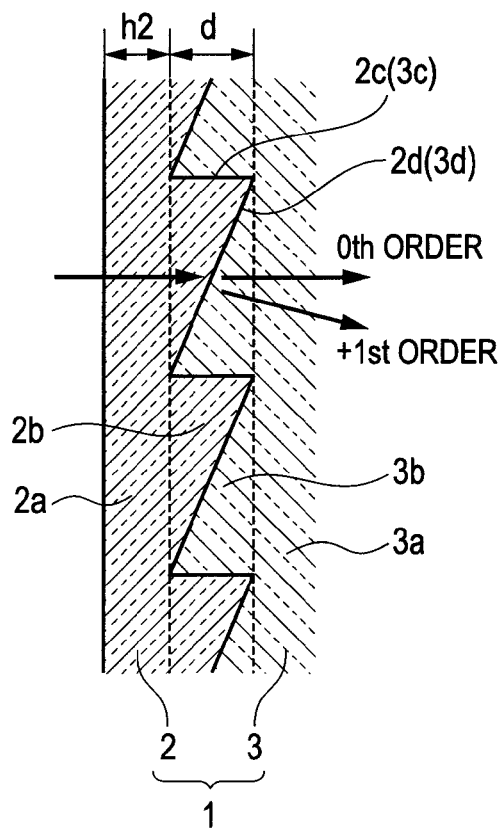
FIG. 2 is a schematic diagram of element structure of the diffractive optical element of FIG. 1.

FIG. 2 illustrates a part of a cross-sectional shape obtained by cutting the diffraction grating portion 1 of the diffractive optical element 10 of FIG. 1 along the line A-A' of FIG. 1. For easier understanding of the grating shape, FIG. 2 illustrates grating portions 2b and 3b in an extremely deformed manner in a direction of grating height (depth). In FIGS. 1 and 2, the diffraction grating portion 1 of the diffractive optical element 10 is structured so that grating surfaces 2d and 3d of a first diffraction grating 2 and a second diffraction grating 3 are in close contact with each other. A grating base portion 2a and the grating portions 2b constitute the first diffraction grating 2, whereas a grating base portion 3a and the grating portions 3b constitute the second diffraction grating 3. The grating portions 2b and 3b are arranged with a predetermined grating pitch. The first and second diffraction gratings 2 and 3 each have a concentrical grating shape with blazed structure, and the lens effect (converging effect or diverging effect) is provided by causing the grating pitch of the grating portions 2b and 3b to change gradually along a direction from the center (optical axis) toward the periphery.

Further, the first and second diffraction gratings 2 and 3 function, through all the layers, as one diffraction grating portion. Further, with the provision of the blazed structure, an incident beam entering the diffractive optical element 10 is diffracted concentratedly toward a direction of a particular diffractive order (+1st order in FIG. 2), relative to a direction of a 0th order diffraction beam passing through the diffraction grating portion 1 without being diffracted.

Further, a wavelength range to be used in the diffractive optical element 10 of the present invention is a visible range (from a wavelength of 430 nm to a wavelength of 670 nm). In consideration of the above, materials which are to form the first diffraction grating 2 and the second diffraction grating 3 and the grating height are selected so that the diffraction efficiency of a diffracted beam in a design order is increased across the entire visible range. Specifically, the material and the grating height of each diffraction grating are determined so that, in the wavelength range used, a maximum optical path length difference (maximum value of an optical path length difference generated between crests and troughs of the grating portions 2b and 3b) among beams passing through multiple diffraction gratings (diffraction gratings 2 and 3) is an integral multiple of the wavelength of the beams or a value near such integral multiple.

By appropriately setting the materials and the grating shapes of the diffraction gratings as described above, a high diffraction efficiency is obtained across the entire wavelength range used. Note that, in general, the grating height of the grating portion of the diffraction grating is defined by a distance between the grating peak and the grating trough in a direction perpendicular to a direction of a grating period (direction of a surface normal). Further, in a case where a grating wall surface 2c (3c) is inclined relative to the direction of the surface normal or in a case where the grating peak is deformed, the grating height is defined by a distance from an intersection between an extended line of the grating surface 2d (3d) and the surface normal.

Next, the diffraction efficiency of the diffraction grating portion 1 is described. In a contacting two-layer DOE having the two diffraction gratings in close contact with each other, when the wavelength is $\lambda$, a condition under which the diffraction efficiency of the diffracted beam in a given order becomes largest is as follows. Specifically, the condition is directed to determining the grating height so that the sum of the optical path length differences generated between the crests and the troughs of the grating portion (that is, differences in optical path length between beams respectively passing through the peak and the bottom of the protrusion) across the entire diffraction grating becomes an integral multiple of the wavelength. Accordingly, in the diffractive optical element 10 of the embodiments of the present invention illustrated in FIGS. 1 and 2, when beams are caused to perpendicularly enter the base surfaces of the diffraction gratings 2 and 3 (grating base portions 2a and 3a) with the wavelength of $\lambda$, the conditional expression for maximizing the diffraction efficiency of the diffracted beam in a diffractive order m is expressed as follows:

$$\pm(n01-n02)d=m\lambda \quad (a1)$$

where n01 represents the refractive index of the first grating material of the first diffraction grating 2 at the wavelength of $\lambda$, n02 represents the refractive index of the second grating material of the second diffraction grating 3 at the wavelength of $\lambda$, d represents the grating height (grating height) of the grating portions 2b and 3b of the first diffraction grating 2 and the second diffraction grating 3, and m represents the diffractive order.

Here, a beam diffracted downward relative to the 0th order diffracted beam of FIG. 2 is regarded as a beam in a positive diffractive order, and a beam diffracted upward relative to the 0th order diffracted beam of FIG. 2 is regarded as a beam in a negative diffractive order. In the expression (a1), the sign of the grating height is determined assuming that the refractive indices n01 and n02 of the first and second grating materials respectively forming the first and second diffraction gratings 2 and 3 satisfy n01<n02. In this case, when the grating shape is structured so that the grating height of the diffraction grating 2 is increased (the grating height of the diffraction grating 3 is decreased) along a direction from bottom to top of FIG. 2, the sign of the grating height is negative. Conversely, when n01>n02 is satisfied and the grating shape is structured so that the grating height of the diffraction grating 2 is decreased (the grating height of the diffraction grating 3 is increased) along the direction from bottom to top of FIG. 2, the sign of the grating height is positive. In summary, when the structure is as illustrated in FIG. 2 and the refractive indices n01 and n02 satisfy n01<n02, the expression (a1) can be transformed as follows.

$$(n02-n01)d=m\lambda \quad (a2)$$

In the structure of FIG. 2, a diffraction efficiency $\eta(\lambda)$ at the wavelength of $\lambda$ can be expressed as follows:

$$\eta(\lambda) = \text{sinc}^2[\Pi\{m - (n02 - n01)d/\lambda\}] \quad (a3)$$
$$= \text{sinc}^2[\Pi\{m - \varphi/\lambda\}]$$

where $\phi$ satisfies $$\phi = (n02-n01)d \quad (a4),$$

and d represents the grating height of the grating portions 2b and 3b.

When it is desired that high diffraction efficiencies be obtained over a wide wavelength band in the contacting two-layer DOE, this is realized by using a material of low refractive index and high dispersion for the first grating material forming the first diffraction grating 2, and using a material of high refractive index and low dispersion for the second grating material forming the second diffraction grating 3. In addition, when it is desired that a diffraction efficiency of 99% or larger be obtained across the entire visible range, a known practice is to use, as the material of low refractive index and high dispersion, a material having a linear dispersion characteristic in which a partial dispersion ratio $\theta gF$ is smaller compared to a normal material. In order to obtain the linear dispersion characteristic, there is known a method in which ITO nanoparticles are mixed into a base resin material while dispersing the ITO nanoparticles.

Unlike other inorganic oxides, the refractive index of ITO changes due to free carriers generated by the doping of tin and the holes of oxygen in addition to due to electron transition. Due to influences from the electron transition and the free carriers, ITO has an extremely strong linear dispersion characteristic. Accordingly, for example, $SnO_2$ and ATO ($SnO_2$ doped with antimony), which, like ITO, are subject to the free carriers, may also be used. By the way, ITO is known as a material having high transmittance and is thus used for transparent electrodes, for example. However, the use of ITO poses a problem when ITO is applied to an optical system which requires high transmittance. The decrease in transmittance of ITO is caused by the doping of tin. For this reason, a material which is transparent and also has a strong linear dispersion characteristic is difficult to obtain.

When it is desired that the transmittance be increased by using the material having ITO nanoparticles dispersed therein, one possible way is to decrease the mixing ratio of the ITO nanoparticles. However, the ITO nanoparticles are a material of high refractive index and high dispersion, and hence if the mixing ratio is decreased, the first grating material of the first diffraction grating 2 comes to exhibit a lower dispersion characteristic. To address this, when the second grating material of the second diffraction grating 3 is selected so that high diffraction efficiency is obtained across the entire visible wavelength band, the grating height is inevitably made thicker. Consequently, the structure thus obtained is not preferred because the transmittance is decreased and the angle characteristic of the diffraction efficiency is degraded.

In the diffraction grating portion according to the present invention, in order to achieve high diffraction efficiency, high transmittance, and small grating height, a material having a weak linear dispersion characteristic, which is made of three or more kinds of materials including a material having the linear dispersion characteristic, is used for the first diffraction grating 2 as the material of low refractive index and high dispersion. Hereinbelow, the diffraction grating portion of each embodiment of the present invention is described.

First Embodiment

Specific structure of a diffractive optical element of a first embodiment of the present invention is described. In this embodiment, a nanoparticle-dispersed resin obtained by dispersing two kinds of nanoparticles in a resin is used for the first grating material forming the first diffraction grating 2, and a nanoparticle-dispersed resin obtained by dispersing one kind of nanoparticles in a resin is used for the second grating material forming the second diffraction grating 3. The first grating material is made by mixing three or more kinds of materials. More specifically, a first material used for the first grating material is the ITO nanoparticles (nd=1.8289, vd=7.47, and θgF=0.360). A second material is $TiO_2$ nanoparticles (nd=2.163, vd=20.0, and θgF=0.680). A third material is a fluorinated acrylic ultraviolet curing resin (nd=1.4030, vd=60.6, and θgF=0.553).

The first material and the second material are mixed into the third material at 6 volumetric % and 13 volumetric %, respectively. The first grating material is a nanoparticle-dispersed material obtained by mixing those three kinds of materials (nd1=1.5704, vd1=24.4, and θgF1=0.552). The material for the second diffraction grating 3 is selected so that high diffraction efficiency is obtained, and thus an acrylic ultraviolet curing resin (nd=1.5241, vd=51.6, and θgF=0.563) is used. The second grating material is a nanoparticle-dispersed material (nd2=1.6169, vd2=48.5, and θgF2=0.583) obtained by dispersing $ZrO_2$ nanoparticles (nd=1.910, vd=45.1, and θgF=0.612) in the acrylic ultraviolet curing resin at 22 volumetric %. The first diffraction grating 2 and the second diffraction grating 3 both have a grating height of 12.72 μm, and constitute the contacting two-layer DOE in which the grating surfaces thereof are in close contact with each other. The design order is set to the +1st order. Note that, the partial dispersion ratio θgF is defined by the following expression:

θgF=(ng−nF)/(nF−nC)

where ng, nF, and nC represent the refractive indices for the g-line, the F-line, and the C-line, respectively. Further, as for the dispersion material, the commonly-known Bruggeman's effective medium theory is used.

Figure 3A:
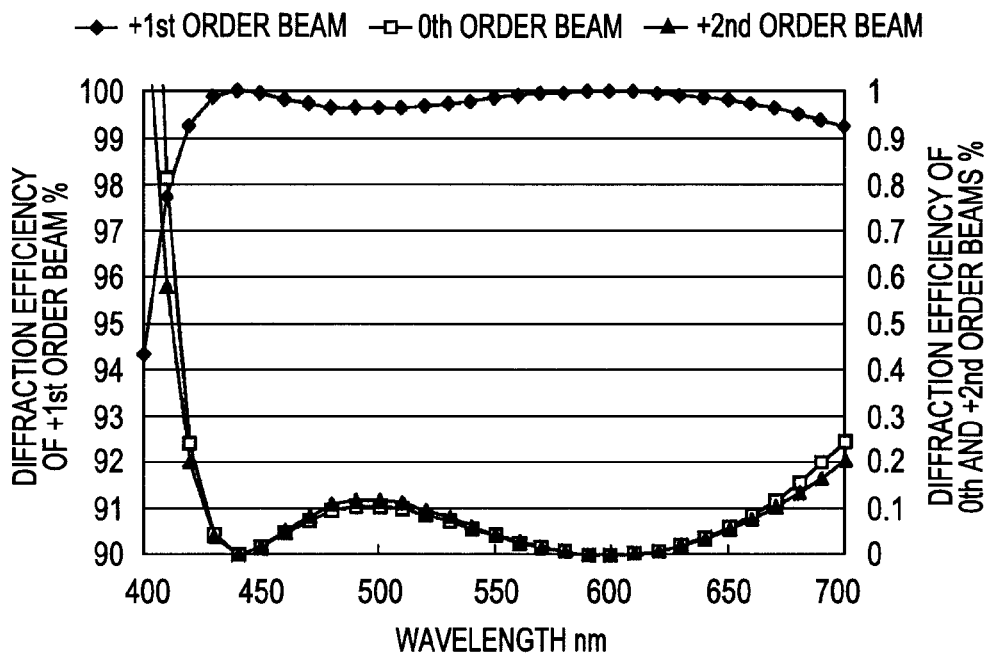
FIG. 3A is a graph of diffraction efficiency of a diffractive optical portion according to a first embodiment.

FIG. 3A shows characteristics of the diffraction efficiency in the design order (+1st order) and of the diffraction efficiencies in the 0th order and +2nd order of the diffraction grating portion. In the graph of FIG. 3A, the diffraction efficiency of the +1st order beam, being the design order, is indicated by numerical values provided along the left ordinate, and the diffraction efficiencies of the 0th order beam and the +2nd order beam are indicated by numerical values provided along the right ordinate. The incident angle is assumed to be perpendicular to the base surface of the grating (grating base portion). In the visible range (from the wavelength of 430 nm to the wavelength of 670 nm), the diffraction efficiency in the design order is equal to or higher than 99.6%, and at the same time, flare generated by unnecessary orders is suppressed to equal to or smaller than 0.2%. Note that, as for the diffraction efficiencies of beams in unnecessary orders other than the design order, only the 0th and +2nd order diffracted beams are considered. This is because the diffraction efficiency sharply drops as the order becomes apart from the design order. Further, of the band known as the visible wavelength band ranging from a wavelength of 400 nm to a wavelength of 700 nm, a range from the wavelength of 430 nm to the wavelength of 670 nm is regarded as a subject of interest. The reason for this is that, at the wavelengths of from 400 nm to 430 nm and from 670 nm to 700 nm, the relative luminosity of wavelength is low, thus having little effect on the image. It is to be understood that a wider wavelength band is more preferred, and the present invention is not limited to the above-mentioned wavelength band. The same applies to the following embodiments.

Figure 3B:
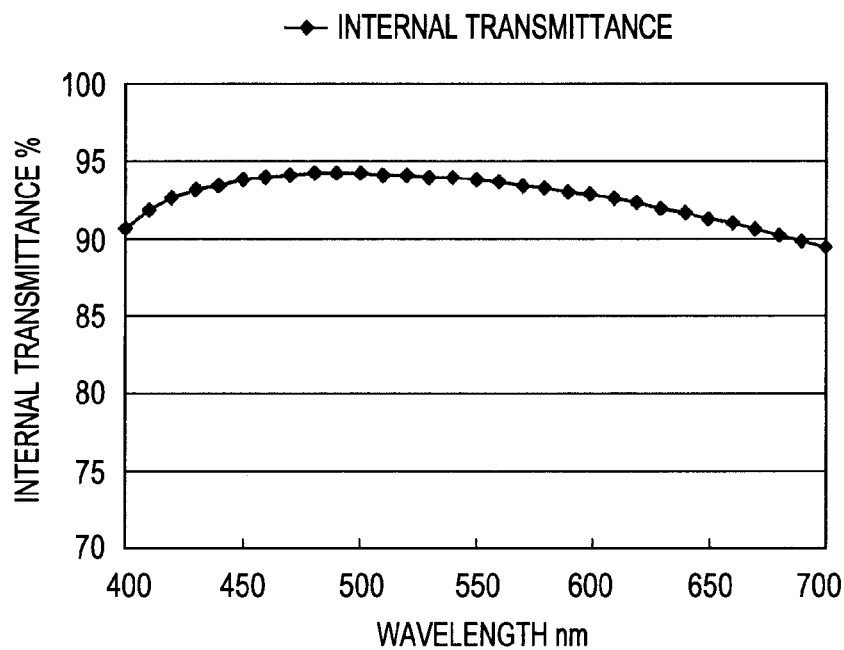
FIG. 3B is a graph of internal transmittance of the diffractive optical portion according to the first embodiment.

FIG. 3B shows a characteristic of internal transmittance of the diffraction grating portion. As illustrated in FIG. 2, a distance over which a beam is attenuated (absorbed) is the sum of ½ of the grating height d, which is the average of height of a saw-tooth blazed shape, and a thickness h2 of the grating base portion 2a, which is a distance between the saw-tooth shape and the grating substrate. Thus, an internal transmittance T of the diffraction grating portion is expressed by an expression (a5):

$$T=\exp(-k\times 4\pi/\lambda \times(d/2+h2))\quad (a5)$$

where k represents an extinction coefficient of the material of the first diffraction grating 2. Further, the material of the second diffraction grating 3 has little internal absorption, and thus the internal absorption may be ignored. Further, the thickness h2 of the grating base portion 2a of the first diffraction grating 2 of the first embodiment is 5 μm. It is to be understood that the internal transmittance becomes higher as the thickness of the grating base portion 2a becomes smaller. As can be seen from FIG. 3B, the internal transmittance of the diffraction grating portion 1 of the first embodiment is 93.2% on average in the entire visible range (from the wavelength of 430 nm to the wavelength of 670 nm). This value of transmittance is higher compared to those of comparison examples to be described later.

Figure 4:
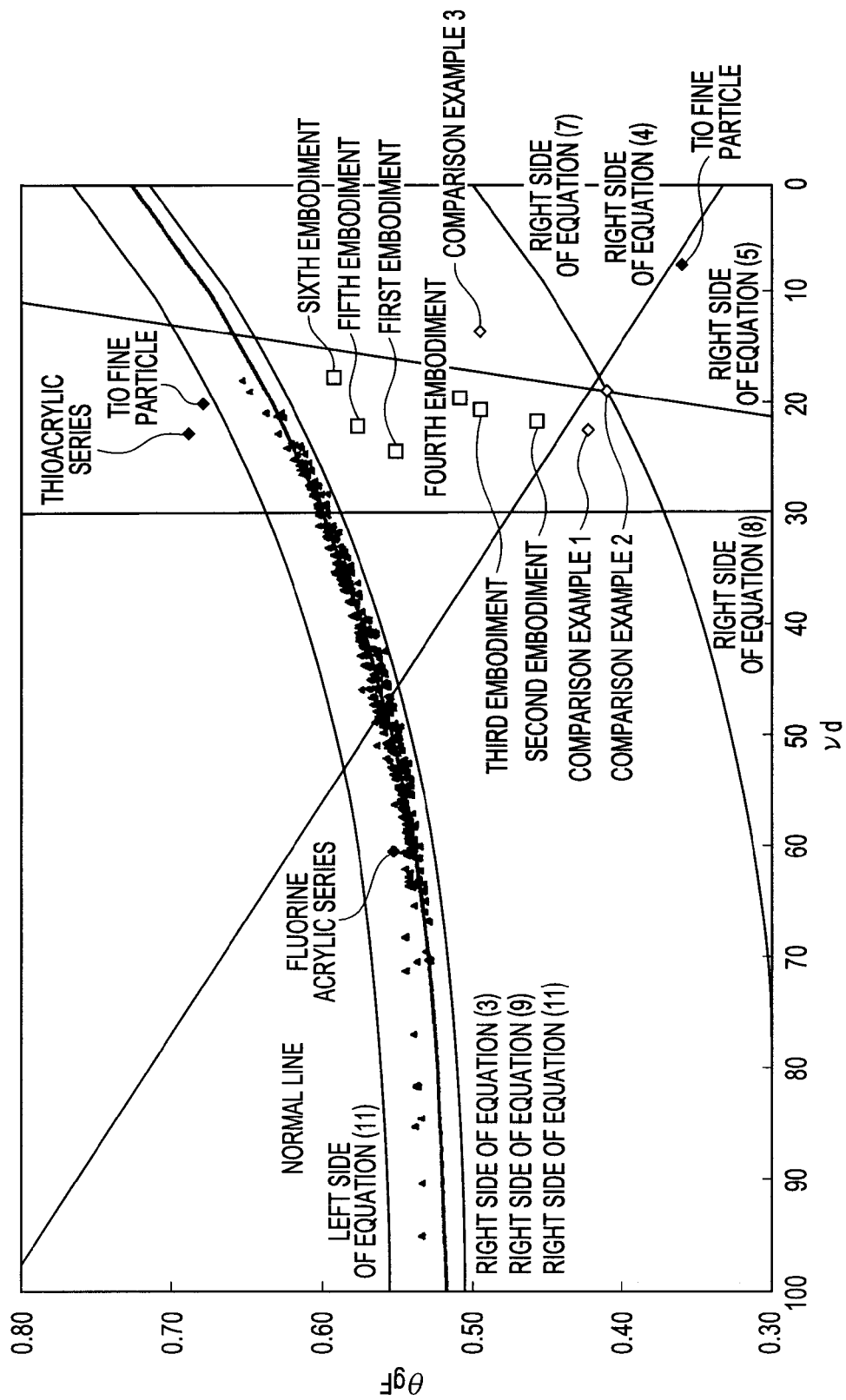
FIG. 4 is a graph showing refractive index characteristics (vd-θgF characteristics) of materials of low refractive index and high dispersion, which constitute the diffractive optical portions according to the first to fifth embodiments.

FIG. 4 shows relation between the partial dispersion ratio θgF and the Abbe number νd of the first grating material of the first diffraction grating 2. It is known that characteristics of normal glass are shown concentratedly in the vicinity of a line called normal line.

The first grating material of the first diffraction grating 2 of this embodiment is obtained by dispersing the ITO nanoparticles in the fluorinated acrylic ultraviolet curing resin, and thus has a more linear dispersion characteristic compared to the normal line. As a result, high diffraction efficiency is obtained. Further, at the same time, by dispersing the $TiO_2$ nanoparticles having a high dispersion characteristic, the mixing ratio (volume ratio) of the ITO nanoparticles is decreased to improve the transmittance. Because the $TiO_2$ nanoparticles have a nonlinear dispersion characteristic, the first grating material of the first diffraction grating 2 comes to have a weak linear dispersion characteristic, but high diffraction efficiency can be obtained across the entire visible range. Two or more different kinds of nanoparticles may be mixed as materials for the first grating material.

As described above, in the contacting two-layer DOE, there is used the material having the weak linear dispersion characteristic, which is made of three or more kinds of materials including the material having the linear dispersion characteristic, as the first grating material of the first diffraction grating 2. With this, high diffraction efficiency and high transmittance are obtained. Moreover, the grating height of the grating portion is made smaller.

Second Embodiment

In a second embodiment, the mixing ratio of the ITO nanoparticles of the first grating material is increased. A nanoparticle-dispersed resin obtained by dispersing two kinds of nanoparticles in a resin is used for the first grating material of the first diffraction grating 2, and a nanoparticle-dispersed resin obtained by dispersing one kind of nanoparticles in a resin is used for the second grating material of the second diffraction grating 3.

More specifically, a first material used for the first grating material is ITO nanoparticles (nd=1.8289, νd=7.47, and θgF=0.360). A second material is $TiO_2$ nanoparticles (nd=2.163, νd=20.0, and θgF=0.680). A third material is a fluorinated acrylic ultraviolet curing resin (nd=1.4030, νd=60.6, and θgF=0.553). The first material and the second material are mixed into the third material at 11 volumetric % and 4 volumetric %, respectively. The first grating material is a nanoparticle-dispersed material having those three kinds of materials mixed therein (nd1=1.515, νd1=21.6, and θgF1=0.458). The material for the second diffraction grating 3 is selected so that high diffraction efficiency is obtained, and thus an acrylic ultraviolet curing resin (nd=1.5241, νd=51.6, and θgF=0.563) is used. The second grating material is a nanoparticle-dispersed material (nd2=1.5670, νd2=49.9, and θgF2=0.574) obtained by dispersing $ZrO_2$ nanoparticles (nd=1.910, νd=45.1, and θgF=0.612) in the acrylic ultraviolet curing resin at 10 volumetric %. The first diffraction grating 2 and the second diffraction grating 3 both have a grating height of 11.08 μm, and constitute the contacting two-layer DOE in which the grating surfaces thereof are in close contact with each other. The design order is set to the +1st order.

Figure 5A:
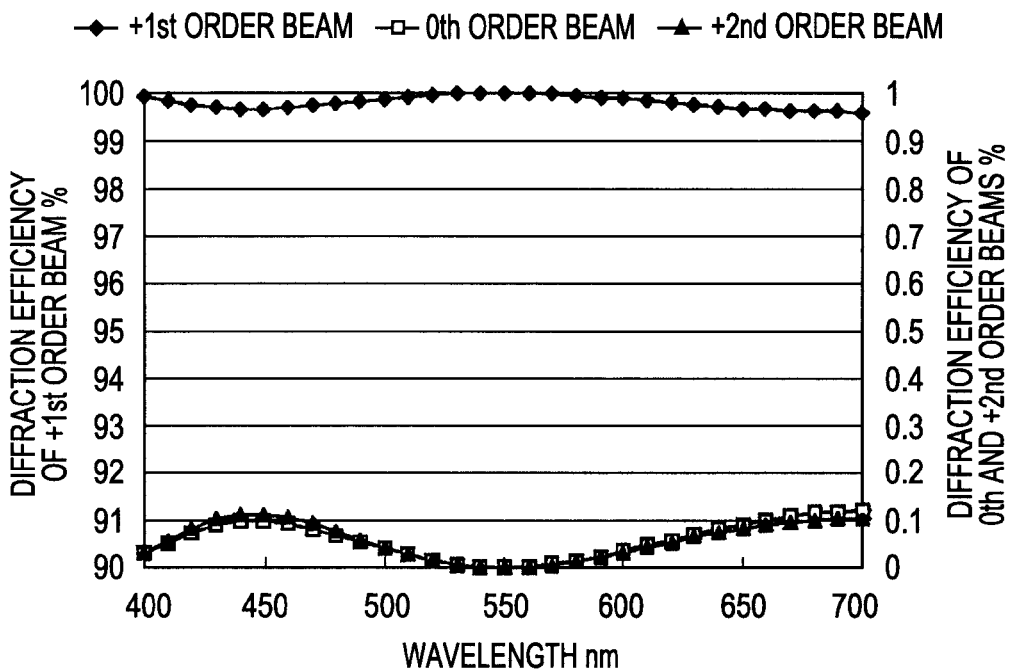
FIG. 5A is a graph of the diffraction efficiency of the diffractive optical portion according to the second embodiment.
Figure 5B:
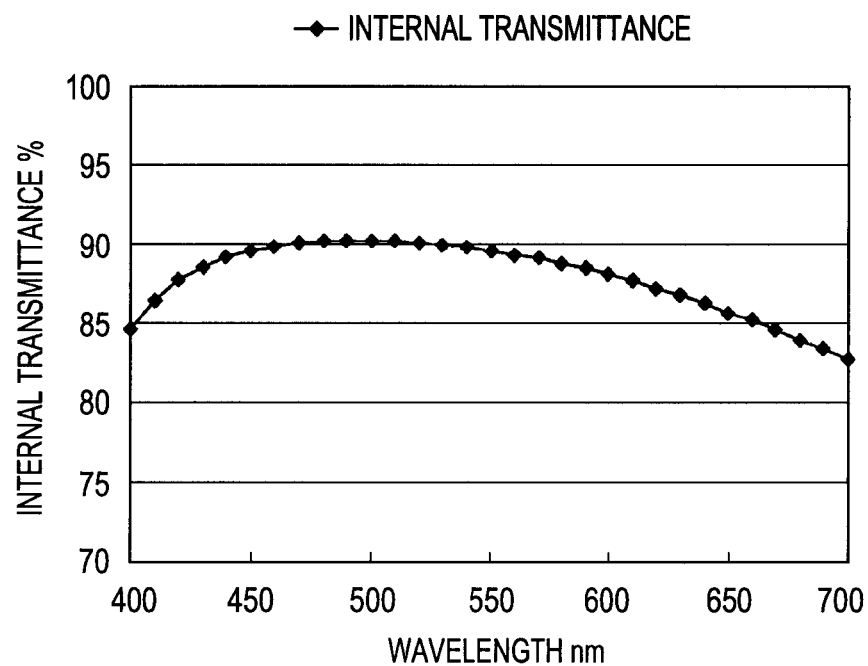
FIG. 5B is a graph of the internal transmittance of the diffractive optical portion according to the second embodiment.

FIG. 5A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.6%, and at the same time, flare generated by unnecessary orders is suppressed to equal to or smaller than 0.2%. FIG. 5B shows a characteristic of internal transmittance of the diffraction grating portion. A thickness h2 of the grating base portion 2a of the first diffraction grating 2 of the second embodiment is 5 μm. As can be seen from FIG. 5B, the internal transmittance of the diffraction grating portion of the second embodiment is 88.6% on average in the entire visible range (from the wavelength of 430 nm to the wavelength of 670 nm). This value of transmittance is higher compared to those of the comparison examples to be described later.

Comparison Example 1

In order to further clarify a distinction of the diffraction efficiency of the diffraction grating portion of the present invention, there is given Comparison Example 1. In Comparison Example 1, a nanoparticle-dispersed resin obtained by dispersing only the ITO nanoparticles in a resin is used for the material of the first diffraction grating 2. Further, the grating height is substantially the same as that in the first embodiment, and the nanoparticle-dispersed resin used has the same mixing ratio of nanoparticles as in the second embodiment. More specifically, a first material used for the first grating material is ITO nanoparticles (nd=1.8289, νd=7.47, and θgF=0.360). A second material is a fluorinated acrylic ultraviolet curing resin (nd=1.4030, νd=60.6, and θgF=0.553). The first grating material is a nanoparticle-dispersed material in which the first material is mixed into the second material at 11 volumetric % (nd1=1.480, νd1=22.6, and θgF1=0.423). The second grating material of the second diffraction grating 3 is selected so that high diffraction efficiency is obtained, and thus an acrylic ultraviolet curing resin (nd2=1.5241, νd2=51.6, and θgF2=0.563) is used. The first diffraction grating 2 and the second diffraction grating 3 both have a grating height of 12.82 μm, and constitute the contacting two-layer DOE in which the grating surfaces thereof are in close contact with each other. The design order is set to the +1st order.

Figure 12A:
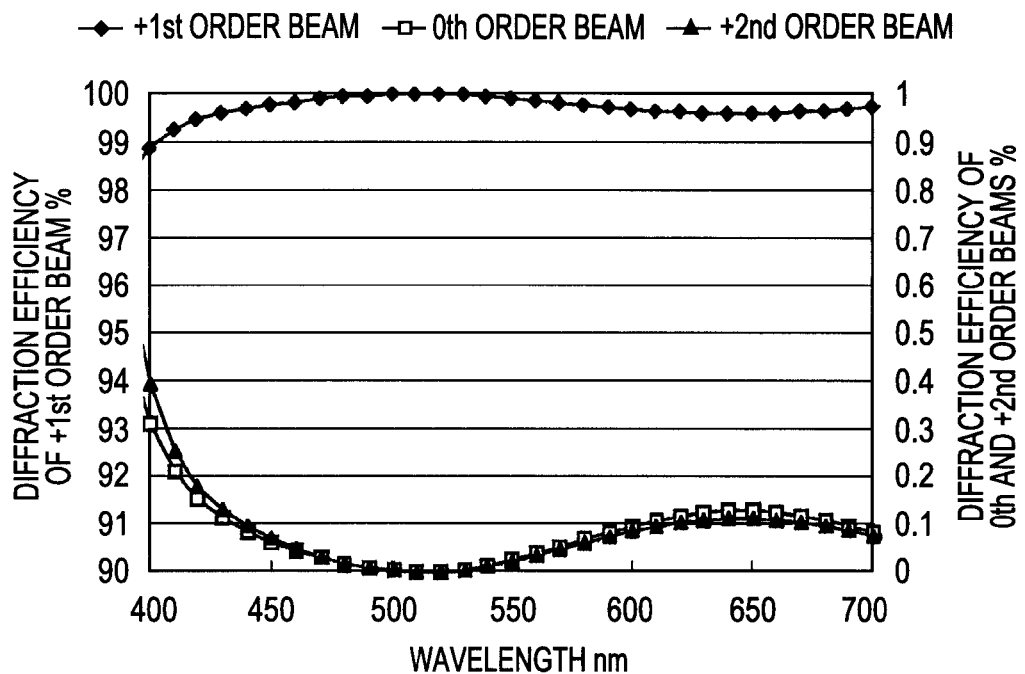
FIG. 12A is a graph of the diffraction efficiency of a diffractive optical portion according to Comparison Example 1.
Figure 12B:
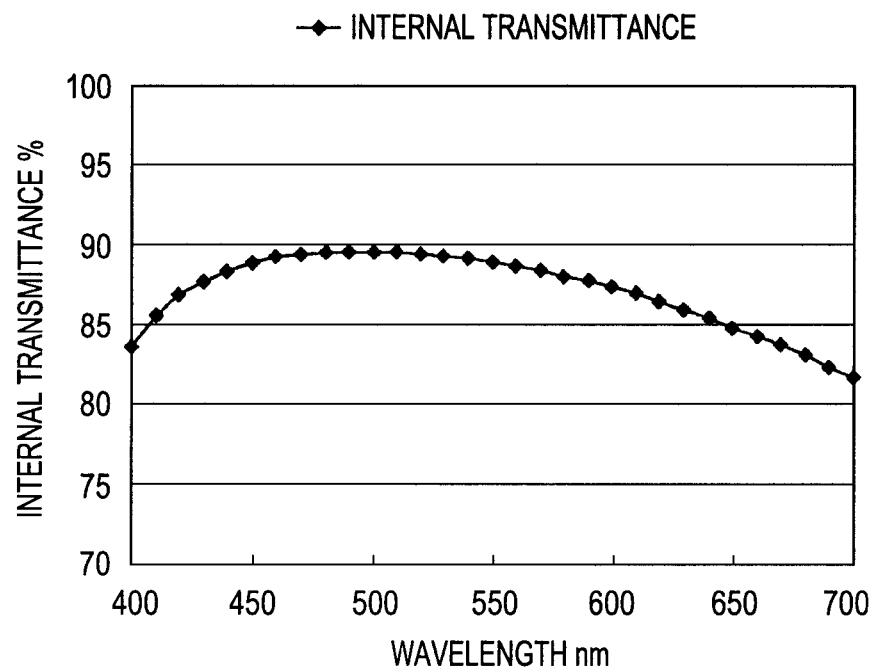
FIG. 12B is a graph of the internal transmittance of the diffractive optical portion according to Comparison Example 1.

FIG. 12A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.6%, and at the same time, flare generated by unnecessary orders is suppressed to equal to or smaller than 0.2%. FIG. 12B shows a characteristic of internal transmittance of the diffraction grating portion. A thickness h2 of the grating base portion of the first diffraction grating 2 of Comparison Example 1 is 5 μm. As can be seen from FIG. 12B, the internal transmittance of the diffraction grating portion of Comparison Example 1 is 87.8% on average in the entire visible range (from the wavelength of 430 nm to the wavelength of 670 nm).

In Comparison Example 1, the grating height is substantially the same as in the first embodiment, but the mixing ratio of the ITO nanoparticles is higher, resulting in lower internal transmittance. Further, due to the fact that the mixing ratio of the ITO nanoparticles is the same as in the second embodiment, the diffraction efficiency in the design order is substantially the same compared to the diffraction efficiency in the second embodiment, but the grating height is larger compared to the grating height in the second embodiment. Hence, the internal transmittance becomes slightly lower, and this is unfavorable when the diffractive optical element is applied to an optical system which requires high transmittance. In addition, due to the large grating height, the angle characteristic of the diffraction efficiency is degraded, and this is unfavorable when the diffractive optical element is applied to an optical system which has a wide incident angle distribution.

Comparison Example 2

In order to further clarify a distinction of the diffraction efficiency of the diffraction grating portion of the present invention, there is given Comparison Example 2. In Comparison Example 2, the grating height is substantially the same as that in the second embodiment, and a nanoparticle-dispersed resin obtained by dispersing only the ITO nanoparticles in a resin is used for the first grating material of the first diffraction grating 2.

More specifically, a first material used for the first grating material is ITO nanoparticles (nd=1.8289, νd=7.47, and θgF=0.360). A second material is a fluorinated acrylic ultraviolet curing resin (nd=1.4030, νd=60.6, and θgF=0.553). The first grating material is a nanoparticle-dispersed material in which the first material is mixed into the second material at 15 volumetric % (nd1=1.497, νd1=19.0, and θgF1=0.410). The second grating material of the second diffraction grating 3 is selected so that high diffraction efficiency is obtained, and thus an acrylic ultraviolet curing resin (nd=1.5241, νd=51.6, and θgF=0.563) is used. The second grating material is a nanoparticle-dispersed material (nd2=1.5500, νd2=50.51, and θgF2=0.570) obtained by dispersing $ZrO_2$ nanoparticles (nd=1.910, νd=45.1, and θgF=0.612) in the acrylic ultraviolet curing resin at 6 volumetric %. The first diffraction grating 2 and the second diffraction grating 3 both have a grating height of 11.02 μm, and constitute the contacting two-layer DOE in which the grating surfaces thereof are in close contact with each other. The design order is set to the +1st order.

Figure 13A:
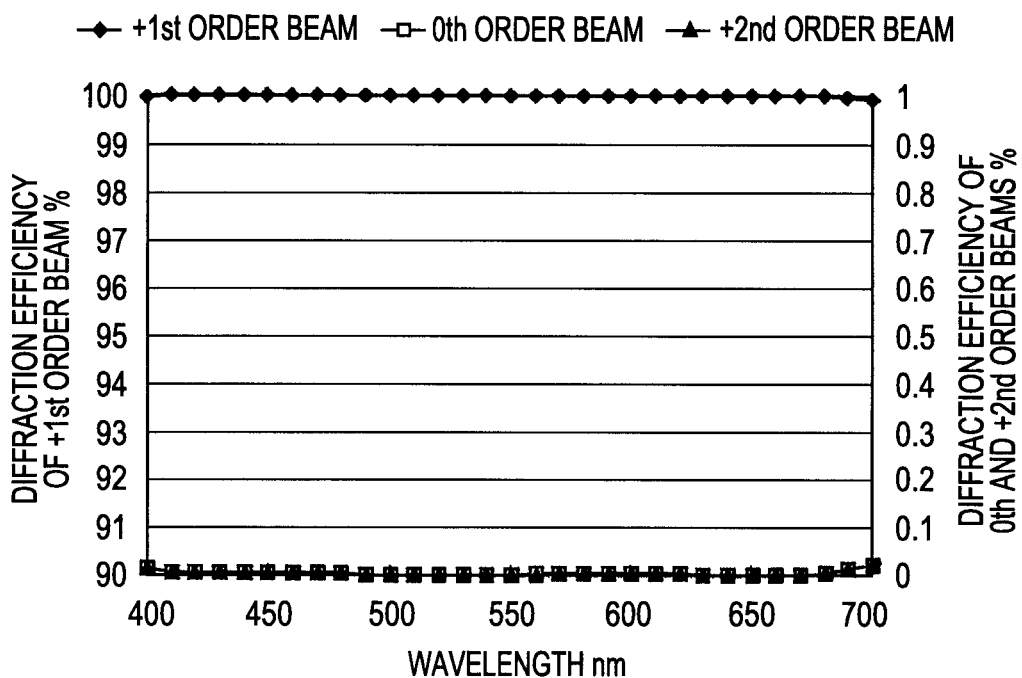
FIG. 13A is a graph of the diffraction efficiency of a diffractive optical portion according to Comparison Example 2.
Figure 13B:
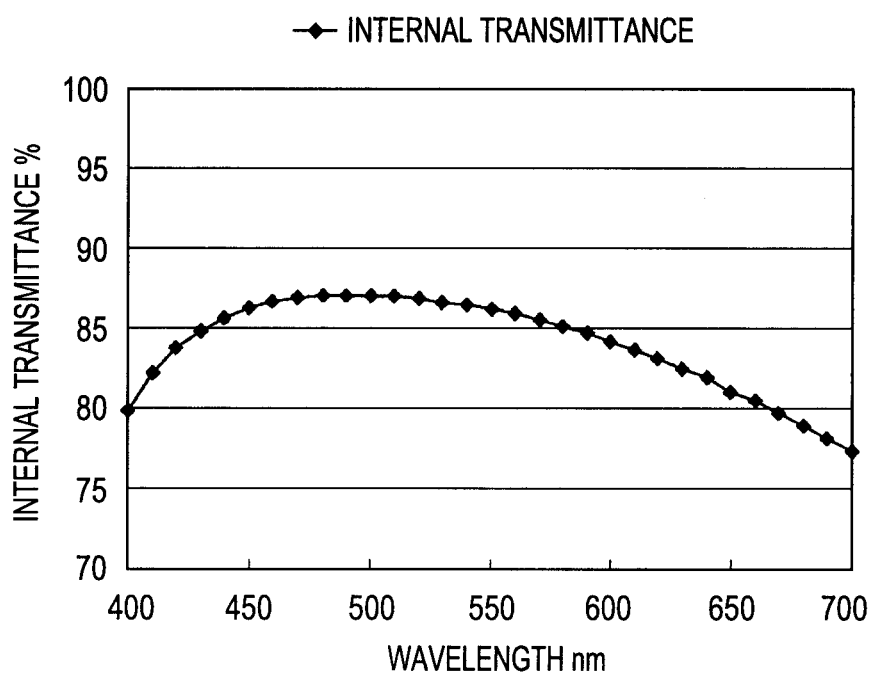
FIG. 13B is a graph of the internal transmittance of the diffractive optical portion according to Comparison Example 2.

FIG. 13A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.9%, and at the same time, flare generated by unnecessary orders is suppressed to equal to or smaller than 0.1%. FIG. 13B shows a characteristic of internal transmittance of the diffraction grating portion. A thickness h2 of the grating base portion of the first diffraction grating 2 of Comparison Example 2 is 5 μm. As can be seen from FIG. 13B, the internal transmittance of the diffraction grating portion of Comparison Example 2 is 84.9% on average in the entire visible range (from the wavelength of 430 nm to the wavelength of 670 nm). As described above, in Comparison Example 2, the grating height is substantially the same as that in the second embodiment, but the mixing ratio of the ITO nanoparticles is higher, resulting in lower internal transmittance. Hence, the structure of Comparison Example 2 is unfavorable when the diffractive optical element is applied to an optical system which requires high transmittance.

As described above, there is used the material having the weak linear dispersion characteristic, which is made of three or more kinds of materials including the material having the linear dispersion characteristic, as the first grating material of the first diffraction grating 2. With this, the diffraction grating portion including the grating portion having high diffraction efficiency, high transmittance, and small grating height can be obtained. Further, in the respective embodiments, more preferably, one or more of the following conditions are satisfied to obtain the diffraction grating portion including the grating portion having high diffraction efficiency, high transmittance, and small grating height. The following conditions are:

$$nd1 < nd2 \tag{1}$$

$$\nu d1 < \nu d2 \tag{2}$$

$$\theta gF1 < (-1.665E{-}07 \times \nu d1^3 + 5.213E{-}05 \times \nu d1^2 - 5.656E{-}03 \times \nu d1 + 0.715) \tag{3}$$

$$\theta gF1 > (+4.80E{-}03 \times \nu d1 + 0.33) \tag{4}$$

$$\theta gF1 > (-4.73E{-}02 \times \nu d1 + 1.31) \tag{5}$$

where νd1 and θgF1 represent the Abbe number and the partial dispersion ratio of the material of the first diffraction grating, respectively.

FIG. 4 is a graph showing relation among curves regarding the conditional expressions (3) to (5) and conditional expressions (6) to (10) to be described later and the partial dispersion ratio θgF and the Abbe number νd of each embodiment and each comparison example. When the conditional expressions (1) and (2) are not satisfied, the contacting two-layer DOE does not have element structure in which a material of low refractive index and high dispersion and a material of high refractive index and low dispersion are used. When the conditional expression (3) is not satisfied, the material of the first diffraction grating does not have the linear dispersion characteristic. Accordingly, in the contacting two-layer DOE, a diffraction efficiency of 99% or higher is difficult to obtain across the entire visible range, which is unfavorable.

When the conditional expressions (4) and (5) are not satisfied, the mixing ratio of the ITO nanoparticles becomes high, resulting in lower internal transmittance. In addition, as the mixing ratio of the ITO nanoparticles becomes higher, the viscosity of the material becomes higher. As a result, it becomes difficult to perform molding with high precision by using a mold. Further, under a state in which the Abbe number of the material of low refractive index and high dispersion is equal to or larger than 30, if the second grating material of the second diffraction grating is selected so that a diffraction efficiency of 99% or higher is obtained across the entire visible range, the grating height becomes equal to or larger than 15 μm. When the grating height is larger, the internal transmittance is decreased, and the angle characteristic of the diffraction efficiency is degraded, which imposes an unfavorable limitation on a range of optical systems to which the diffractive optical element is applied. Further, in the diffraction grating portion according to the present invention, it is preferred that such a material that is obtained by mixing three or more kinds of materials including the first material and the second material which satisfy the following expressions be used as the first grating material of the first diffraction grating. By doing so, a diffraction grating portion including a grating portion having high diffraction efficiency, high transmittance, and small grating height can be obtained. The above-mentioned expressions are:

$$k11 > 0.001 \tag{6}$$

$$\theta gF11 < (-1.665E{-}07 \times \nu d11^3 + 5.213E{-}05 \times \nu d11^2 - 5.656E{-}03 \times \nu d11 + 0.500) \tag{7}$$

$$\nu d12 < 30 \tag{8}$$

$$\theta gF12 > (-1.665E{-}07 \times vd12^3 + 5.213E{-}05 \times vd12^2 - 5.656E{-}03 \times vd12 + 0.715) \qquad (9)$$

where k11 represents the extinction coefficient of the first material for the d-line, vd11 represents the Abbe number of the first material, θgF11 represents the partial dispersion ratio of the first material, vd12 represents the Abbe number of the second material, and θgF12 represents the partial dispersion ratio of the second material.

When the conditional expressions (6) and (7) are not satisfied, less absorption occurs in the first grating material, but the linear characteristic is not obtained. As a result, a diffraction efficiency of 99% or higher is difficult to obtain across the entire visible range, which is unfavorable. When the conditional expression (8) is not satisfied, the dispersion characteristic of the first grating material of the first diffraction grating is decreased, with the result that the grating height of the grating portion is increased. When the grating height of the grating portion is desired to be smaller, the mixing ratio of a material having the linear dispersion characteristic needs to be increased, which then makes the internal transmittance lower. For this reason, when the conditional expression (9) is not satisfied, the weak linear dispersion characteristic cannot be obtained if the first material having the strong linear dispersion characteristic which satisfies the conditional expression (7) is mixed. Therefore, a diffraction efficiency of 99% or higher is difficult to obtain across the entire visible range, which is unfavorable.

Further, in the first grating material of the first diffraction grating having the three or more kinds of materials mixed therein, as long as a conditional expression (10), which is similar to the conditional expression (9), is satisfied, there is no particular limitation on the third material different from the second material. The third material may be selected arbitrarily. For example, when the first grating material of the first diffraction grating is desired to have a lower refractive index, a material of low refractive index may be used as the third material, whereas when the first grating material is desired to have a higher refractive index, a material of high refractive index may be used.

Specifically, the following conditional expression (10) is satisfied:

$$\theta gF13 > (-1.665E{-}07 \times vd13^3 + 5.213E{-}05 \times vd13^2 - 5.656E{-}03 \times vd13 + 0.715) \qquad (10)$$

where vd13 and θgF13 represent the Abbe number and the partial dispersion ratio of the third material, respectively.

Further, the diffraction grating portion according to the present invention is not limited to the grating materials of the embodiments of the present invention. The resin material having the $TiO_2$ nanoparticles dispersed therein is used as the grating material, but the present invention is not limited thereto. Further, to give examples of the nanoparticle materials to be used in the respective embodiments, any one of inorganic nanoparticle materials including an oxide, a metal, a ceramic, a compound, and a mixture is commonly used, and the present invention is not limited thereto. Further, as the resin material, the ultraviolet curing resin of fluorine series is used. However, any one of organic resins of acrylic series, fluorine series, vinyl series, epoxy series, and thio series may be used, and the present invention is not limited to those resin materials. Considering that the resin material is mixed with the ITO nanoparticles and is then used as the material of low refractive index and high dispersion, the Abbe number of the resin material is preferably equal to or smaller than 30.

If a material having the Abbe number equal to or larger than 30 is used, the dispersion characteristic of the grating material of the first diffraction grating is decreased, resulting in a larger grating height, or a dispersion amount of the ITO nanoparticles needs to be increased, which is unfavorable. In view of the above, use of nanoparticles including inorganic oxides such as $TiO_2$, $Ta_2O_5$, $Nb_2O_5$, ZnO, $SrTiO_3$, and $BaTiO_3$ is effective. Note that, those materials may be used as appropriate when forming the diffraction grating by using three or more kinds of materials. Further, in the first and second embodiments, three kinds of materials are mixed to obtain the grating material of the first diffraction grating. However, four or more kinds of materials may be used, and the present invention is not limited thereto.

As for the second grating material of the second diffraction grating, because the material of low refractive index and high dispersion has the linear characteristic compared to the normal line, if a material satisfying the following expression is selected, high diffraction efficiency can be obtained across the entire visible range.

$$(-1.665E{-}07 \times vd2^3 + 5.213E{-}05 \times vd2^2 - 5.656E{-}03 \times vd2 + 0.715) < \theta gF2 < (-1.665E{-}07 \times vd2^3 + 5.213E{-}05 \times vd2^2 - 5.656E{-}03 \times vd2 + 0.765) \qquad (11)$$

Further, high diffraction efficiency can be obtained across the entire visible range when an expression obtained by dividing the optical path length difference (expression (a4)) caused by the diffraction gratings with respect to an m-th order diffracted beam, the m-th order being the design order, by the product of the design order and the wavelength satisfies the following condition:

$$0.945 \leq (n2(\lambda) - n1(\lambda)) d/(m\lambda) \leq 1.055 \qquad (12)$$

where n1(λ) and n2(λ) represent the refractive indices of the first and second grating materials at the wavelength of λ, respectively, and λ represents an arbitrary wavelength in the visible range. When the expression fails to fall within this range, the diffraction efficiency in the design order is decreased, and the diffraction efficiencies in unnecessary orders are increased, which is unfavorable.

Further, in the embodiments of the present invention, the resin material having the $ZrO_2$ nanoparticles dispersed therein is used as the second grating material of the second diffraction grating, but the present invention is not limited thereto. For example, an organic material such as a resin material, a glass material, an optical crystal material, and a ceramic material may be used, and the present invention is not limited thereto. Further, as the nanoparticle material for the dispersed nanoparticles, any one of inorganic nanoparticle materials including an oxide, a metal, a ceramic, a compound, and a mixture may be used, and the present invention is not limited to the nanoparticle materials described above. High diffraction efficiency can be obtained by selecting any material as long as the material satisfies the conditional expression (11), and also satisfies the conditional expression (12) when combined with the first grating material of the first diffraction grating.

Further, the total of the mixing ratios (volume ratios) of the nanoparticles in the nanoparticle-dispersed material is preferably 3 volumetric % or larger and 25 volumetric % or smaller. If the mixing ratio is smaller than 3 volumetric %, the refractive index is difficult to control, whereas if the mixing ratio exceeds 25 volumetric %, the viscosity of the nanoparticle-dispersed material is increased, which then makes the molding using a mold difficult to perform. Further, the mixing ratio of the ITO nanoparticles is preferably 3 volumetric % or larger and 15 volumetric % or smaller. If the mixing ratio is smaller than 3 volumetric %, the refractive index is difficult to control, and also, the linear dispersion characteristic cannot be obtained for the first grating material of the first diffraction grating. If the mixing ratio exceeds 15 volumetric %, the decrease in internal transmittance cannot be ignored when the diffractive optical element is applied to an optical system which requires high transmittance.

Further, the average particle diameter of the nanoparticle material is preferably equal to or smaller than ¼ of the wavelength (operating wavelength or design wavelength) of the incident beam entering the diffraction grating portion. If the particle diameter is larger than the above-mentioned size, Rayleigh scattering may become larger when the nanoparticle material is mixed into the resin material. Further, in the embodiments, the design order is set to the +1st order, but the same effects can be obtained when the design order is set to another order than the +1st order, and thus the present invention is not limited to the design order described in the embodiments. Further, though there is no particular limitation on a method for manufacturing the diffraction grating portion, the molding using a mold is preferred because the blazed shape can be manufactured with high precision.

Specifically, the first diffraction grating is molded by using a mold, and then, the grating portion is filled in with the material to form the second diffraction grating and is bonded thereto, thereby manufacturing the diffraction grating portion. Conversely, the second diffraction grating may be molded first before the grating portion is filled in and the first diffraction grating is bonded thereto. Alternatively, there may be employed a method in which the first diffraction grating and the second diffraction grating are respectively manufactured and are then brought into close contact with high precision. The respective embodiments are not limited to those manufacturing methods.

The thickness h2 of the grating base portion 2a of the first diffraction grating 2 is preferably equal to or smaller than 10 μm. Further, the average height (grating height) of the grating portion, which is the sum of half the grating height (d/2) of the grating portion of the first and second diffraction gratings and the thickness h2 of the grating base portion 2a, is preferably equal to or smaller than 15 μm. Particularly, the average height of the grating portion of the first diffraction grating is preferably equal to or smaller than 15 μm. If the thickness exceeds this value, the internal transmittance is decreased, which poses a problem when the diffractive optical element is applied to an optical system which requires high transmittance. A smaller thickness of the grating base portion 2a is preferred because the internal transmittance becomes higher. However, when the first diffraction grating 2 is manufactured by using a mold, the precision of the blazed shape is decreased due to uneven shrinkage. Thus, the thickness of the grating base portion 2a is preferably equal to or larger than 1 μm.

Further, a thin film layer may be provided at an interface between the first grating material of the first diffraction grating 2 and the second grating material of the second diffraction grating 3, and the present invention is not limited thereto. When the interfacial adhesion between the first grating material of the first diffraction grating 2 and the second grating material of the second diffraction grating 3 is not satisfactory, the adhesion can be improved by providing a bonding layer at the interface between the first diffraction grating 2 and the second diffraction grating 3. Further, when a difference between the refractive indices of the first grating material of the first diffraction grating 2 and the second grating material of the second diffraction grating 3 is large, the interface reflectance can be reduced by providing an anti-reflection layer at the interface between the first diffraction grating 2 and the second diffraction grating 3. Further, the diffraction grating portion 1 and a surface opposite thereto are not limited to a flat plane and may be spherical or aspherical. In such a case, a spherical or aspherical shape can be molded simultaneously with the diffraction grating, resulting in easier manufacture.

Third Embodiment

In a third embodiment, a nanoparticle-dispersed resin obtained by dispersing two kinds of nanoparticles in a resin is used for the first grating material of the first diffraction grating 2, and a nanoparticle-dispersed resin obtained by dispersing one kind of nanoparticles in a resin is used for the second grating material of the second diffraction grating 3. In the third embodiment, the grating height of the grating portion is made smaller. More specifically, a first material used for the first grating material is ITO nanoparticles (nd=1.8289, νd=7.47, and θgF=0.360). A second material is $TiO_2$ nanoparticles (nd=2.163, νd=20.0, and θgF=0.680). A third material is a fluorinated acrylic ultraviolet curing resin (nd=1.4030, νd=60.6, and θgF=0.553). The first material and the second material are mixed into the third material at 11 volumetric % and 10 volumetric %, respectively. The first grating material is a nanoparticle-dispersed material having those three kinds of materials mixed therein (nd1=1.5660, νd1=20.6, and θgF1=0.496).

The second grating material of the second diffraction grating 3 is selected so that high diffraction efficiency is obtained, and thus an acrylic ultraviolet curing resin (nd=1.5241, νd=51.6, and θgF=0.563) is used. The second grating material is a nanoparticle-dispersed material (nd2=1.6291, νd2=48.2, and θgF2=0.585) obtained by dispersing $ZrO_2$ nanoparticles (nd=1.910, νd=45.1, and θgF=0.612) in the acrylic ultraviolet curing resin at 25 volumetric %. The first diffraction grating 2 and the second diffraction grating 3 both have a grating height of 9.25 μm, and constitute the contacting two-layer DOE in which the grating surfaces thereof are in close contact with each other. The design order is set to the +1st order.

Figure 6A:
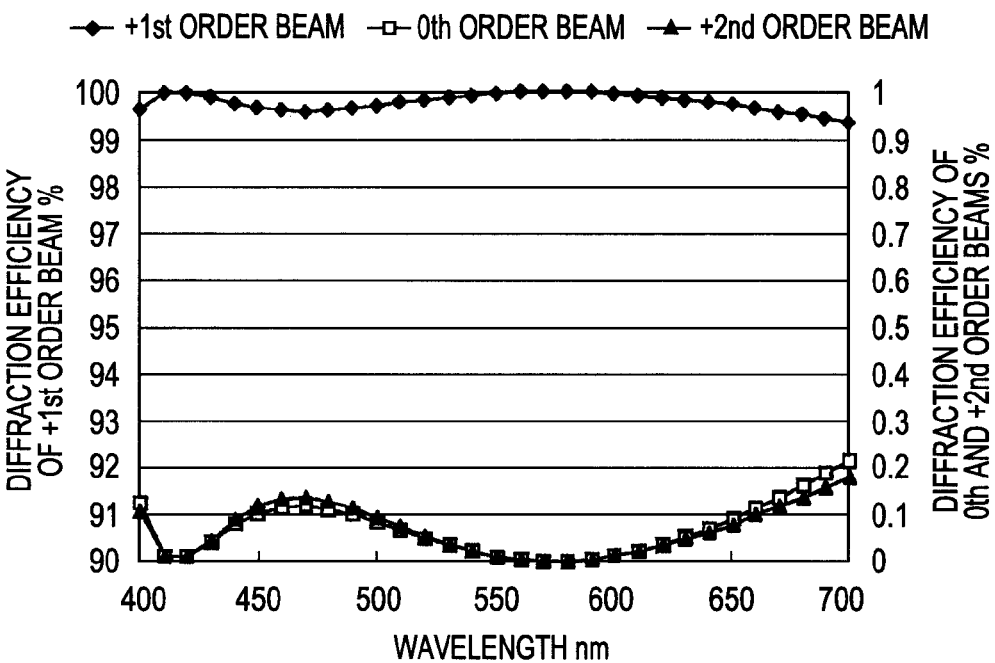
FIG. 6A is a graph of the diffraction efficiency of the diffractive optical portion according to the third embodiment.
Figure 6B:
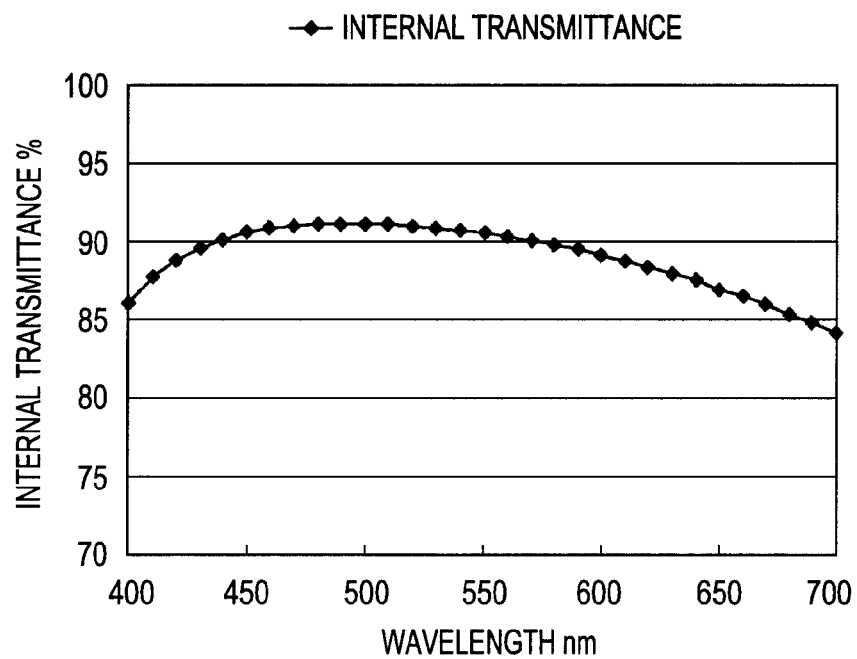
FIG. 6B is a graph of the internal transmittance of the diffractive optical portion according to the third embodiment.

FIG. 6A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.5%, and at the same time, flare generated by unnecessary orders is suppressed to equal to or smaller than 0.2%. FIG. 6B shows a characteristic of internal transmittance of the diffraction grating portion. A thickness h2 of the grating base portion of the first diffraction grating 2 of the third embodiment is 5 μm. As can be seen from FIG. 6B, the internal transmittance of the diffraction grating portion of the third embodiment is 89.6% on average in the entire visible range (from the wavelength of 430 nm to the wavelength of 670 nm). As described above, in the third embodiment, the dispersion amount of the ITO nanoparticles is the same as in Comparison Example 1, but the diffraction grating portion having a smaller grating height can be obtained because the $TiO_2$ nanoparticles are also dispersed.

Fourth Embodiment

In a fourth embodiment, a nanoparticle-dispersed resin obtained by dispersing one kind of nanoparticles in two kinds of resins is used for the first grating material of the first diffraction grating 2, and a nanoparticle-dispersed resin obtained by dispersing one kind of nanoparticles in a resin is used for the second grating material of the second diffraction grating 3. In the fourth embodiment, the grating height of the grating portion is made smaller. More specifically, a first material used for the first grating material is ITO nanoparticles (nd=1.8289, vd=7.47, and θgF=0.360). A second material is a fluorinated acrylic ultraviolet curing resin (nd=1.4030, vd=60.6, and θgF=0.553). A third material is a thioacrylic ultraviolet curing resin (nd=1.6356, vd=22.7, and θgF=0.689). The second material, the third material, and the first material are mixed at 54 volumetric %, 35 volumetric %, and 11 volumetric %, respectively. The first grating material is a nanoparticle-dispersed material having those three kinds of materials mixed therein (nd1=1.5522, vd1=19.5, and θgF1=0.509).

The second grating material of the second diffraction grating 3 is selected so that high diffraction efficiency is obtained, and thus an acrylic ultraviolet curing resin (nd=1.5241, vd=51.6, and θgF=0.563) is used. The second grating material is a nanoparticle-dispersed material (nd2=1.6209, vd2=48.4, and θgF2=0.584) obtained by dispersing $ZrO_2$ nanoparticles (nd=1.910, vd=45.1, and θgF=0.612) in the acrylic ultraviolet curing resin at 23 volumetric %. The first diffraction grating 2 and the second diffraction grating 3 of the grating portion both have a grating height of 8.52 μm, and constitute the contacting two-layer DOE in which the grating surfaces thereof are in close contact with each other. The design order is set to the +1st order.

Figure 7A:
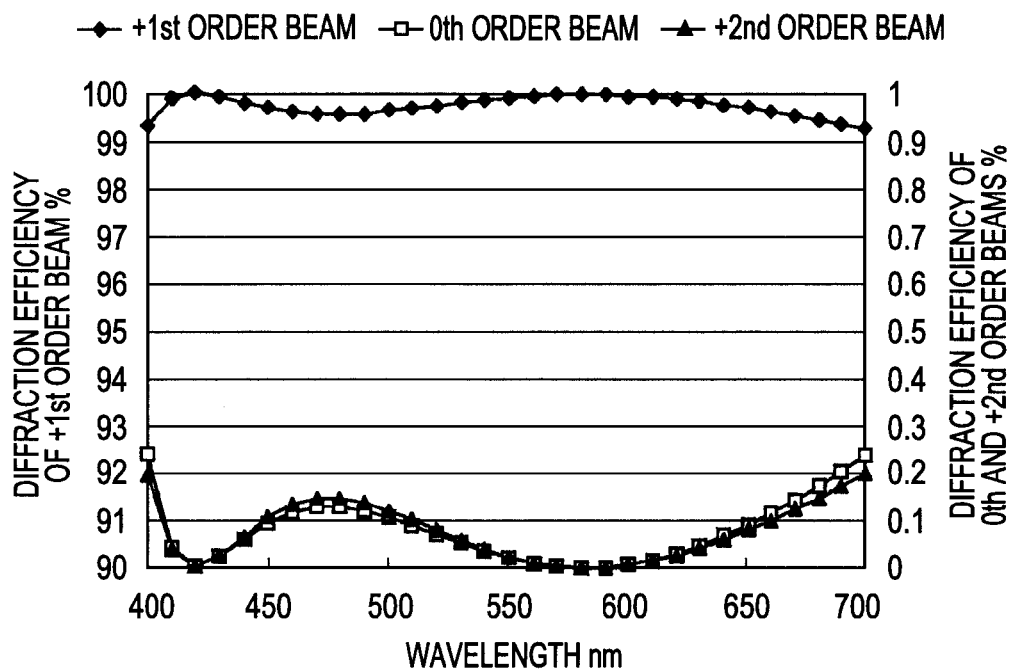
FIG. 7A is a graph of the diffraction efficiency of the diffractive optical portion according to the fourth embodiment.
Figure 7B:
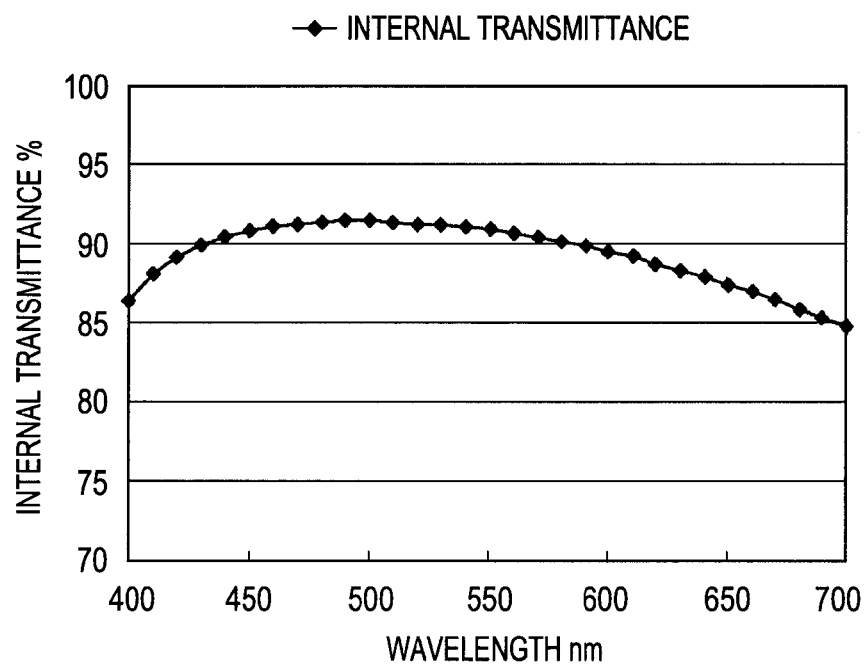
FIG. 7B is a graph of the internal transmittance of the diffractive optical portion according to the fourth embodiment.

FIG. 7A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.5%, and at the same time, flare generated by unnecessary orders is suppressed to equal to or smaller than 0.2%. FIG. 7B shows a characteristic of internal transmittance of the diffraction grating portion. A thickness h2 of the grating base portion 2a of the first diffraction grating 2 of the fourth embodiment is 5 μm. As can be seen from FIG. 7B, the internal transmittance of the diffraction grating portion of the fourth embodiment is 89.9% on average in the entire visible range (from the wavelength of 430 nm to the wavelength of 670 nm).

In the fourth embodiment, similarly to the third embodiment, the amount of the ITO nanoparticles is the same as that in Comparison Example 1, but there is used the resin obtained by mixing the fluorinated acrylic ultraviolet curing resin of low refractive index and low dispersion and the thioacrylic ultraviolet curing resin of high refractive index and high dispersion. With this, the diffraction grating portion which realizes the grating portion having high diffraction efficiency, high transmittance, and small grating height can be obtained. FIG. 4 shows the relation between the partial dispersion ratio θgF and the Abbe number vd of the material of low refractive index and high dispersion according to the present invention. The curve is for the normal glass material and is called normal line. It is known that the characteristics of the normal glass are shown concentratedly in the vicinity of this line.

The first grating material of the first diffraction grating 2 of this embodiment is obtained by dispersing the ITO nanoparticles in the fluorinated acrylic ultraviolet curing resin, and thus has a more linear dispersion characteristic compared to the normal line. As a result, high diffraction efficiency is obtained. Further, at the same time, by mixing the thioacrylic ultraviolet curing resin having high dispersion, the mixing ratio of the ITO nanoparticles is decreased to improve the transmittance. Because the thioacrylic ultraviolet curing resin has a nonlinear dispersion characteristic, the first grating material of the first diffraction grating 2 of this embodiment comes to have a weak linear dispersion characteristic, but high diffraction efficiency can be obtained across the entire visible range.

In the first to third embodiments, the two kinds of nanoparticles are dispersed, but in this case, the total of the mixing ratios (total volume ratio) of the nanoparticles is preferably equal to or smaller than 25% in terms of manufacture, thus imposing a limitation on the dispersion amount of the nanoparticles having a high dispersion characteristic. On the other hand, when the ITO nanoparticles are dispersed in two kinds of resins as in the fourth embodiment, there is a limitation only on the dispersion amount of the ITO nanoparticles, and there is no limitation on the mixing ratio of the two kinds of resins. Accordingly, the range of choices of materials is broadened. Note that, the present invention is not limited to a resin having the nonlinear dispersion characteristic. Even when a non-linear material such as the thioacrylic ultraviolet curing resin is not used, the linear characteristic of the ITO nanoparticles can be shifted to the weaker linear side, and thus the present invention is not limited to the material described above.

Further, as the resin material, any one of organic resins of acrylic series, fluorine series, vinyl series, epoxy series, and thio series may be used, and the present invention is not limited to those resin materials. Note that, those materials may be used as appropriate when forming the diffraction grating by using three or more kinds of materials. Considering that those materials are mixed with the ITO nanoparticles to decrease the mixing ratio of the ITO nanoparticles and are then used as the material of low refractive index and high dispersion, it is preferred that a resin having the Abbe number equal to or smaller than 30 be used. If a material having the Abbe number equal to or smaller than 30 is not used, the dispersion characteristic of the first grating material of the first diffraction grating is decreased, resulting in a larger grating height of the grating portion. When the grating height is desired to be smaller, the mixing ratio of the ITO nanoparticles needs to be increased, which is unfavorable. Further, as to the two kinds of resins described herein, resin components which affect the refractive indices are mainly described. In a case where such resin components as an initiator material and a dispersant material affect the refractive indices, the mixing ratios of the materials may be set in consideration thereof.

Fifth Embodiment

In a fifth embodiment, similarly to the fourth embodiment, a nanoparticle-dispersed resin obtained by dispersing one kind of nanoparticles in two kinds of resins is used for the first grating material of the first diffraction grating 2, and a nanoparticle-dispersed resin obtained by dispersing one kind of nanoparticles in a resin is used for the second grating material of the second diffraction grating 3. In the fifth embodiment, the transmittance of the diffraction grating portion is made higher. More specifically, a first material used for the first grating material is ITO nanoparticles (nd=1.8289, vd=7.47, and θgF=0.360). A second material is a fluorinated acrylic ultraviolet curing resin (nd=1.4030, vd=60.6, and θgF=0.553). A third material is a thioacrylic ultraviolet curing resin (nd=1.6356, vd=22.7, and θgF=0.689). The second material, the third material, and the first material are mixed at 43 volumetric %, 51 volumetric %, and 6 volumetric %, respectively. The first grating material is a nanoparticle-dispersed material having those three kinds of materials mixed therein (nd1=1.5636, vd1=22.1, and θgF1=0.577).

The second grating material of the second diffraction grating 3 is selected so that high diffraction efficiency is obtained, and thus an acrylic ultraviolet curing resin (nd=1.5241, vd=51.6, and θgF=0.563) is used. The second grating material is a nanoparticle-dispersed material (nd2=1.6209, vd2=48.4, and θgF2=0.584) obtained by dispersing $ZrO_2$ nanoparticles (nd=1.910, vd=45.1, and θgF=0.612) in the acrylic ultraviolet curing resin at 23 volumetric %. The first diffraction grating 2 and the second diffraction grating 3 of the grating portion both have a grating height of 10.33 μm, and constitute the contacting two-layer DOE in which the grating surfaces thereof are in close contact with each other. The design order is set to the +1st order.

Figure 8A:
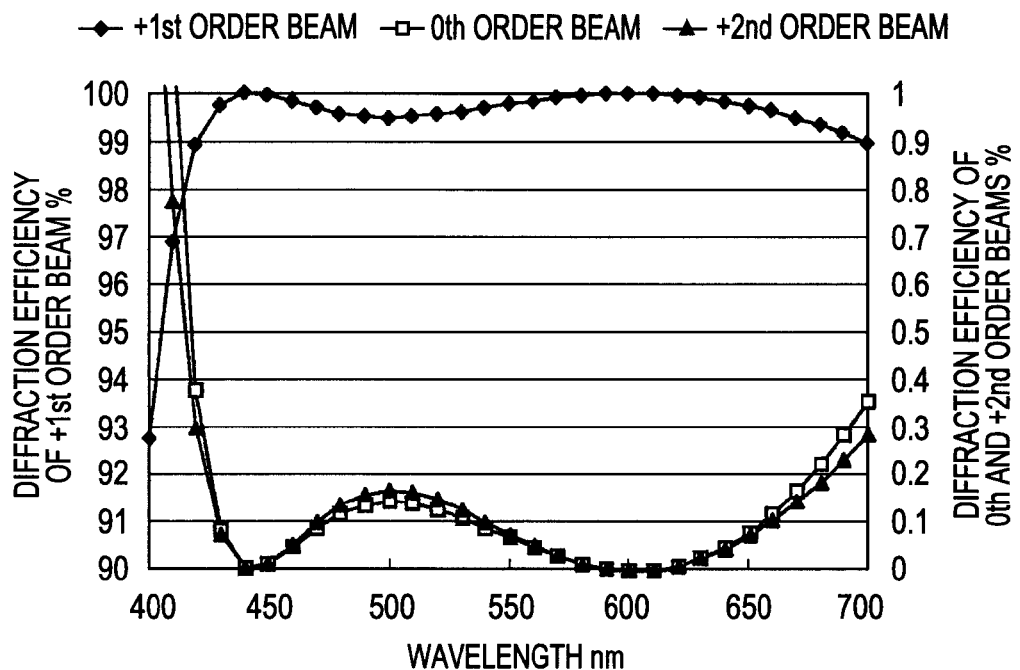
FIG. 8A is a graph of the diffraction efficiency of the diffractive optical portion according to the fifth embodiment.
Figure 8B:
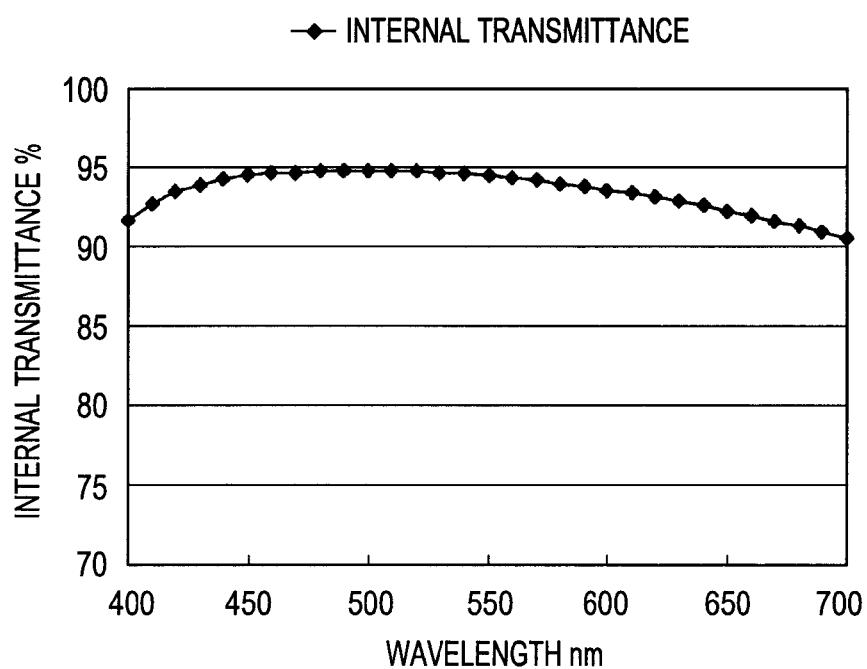
FIG. 8B is a graph of the internal transmittance of the diffractive optical portion according to the fifth embodiment.

FIG. 8A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.5%, and at the same time, flare generated by unnecessary orders is suppressed to equal to or smaller than 0.2%. FIG. 8B shows a characteristic of internal transmittance of the diffraction grating portion. A thickness h2 of the grating base portion 2a of the first diffraction grating 2 of the fifth embodiment is 5 μm. As can be seen from FIG. 8B, the internal transmittance of the diffraction grating portion of the fifth embodiment is 93.9% on average in the entire visible range (from the wavelength of 430 nm to the wavelength of 670 nm).

In the fifth embodiment, similarly to the first embodiment, the mixing ratio of the ITO nanoparticles is the same as that in the first embodiment, but there is used the resin obtained by mixing the fluorinated acrylic ultraviolet curing resin of low refractive index and low dispersion and the thioacrylic ultraviolet curing resin of high refractive index and high dispersion. With this, compared to the first embodiment, the diffractive optical element including the grating portion having further smaller grating height and further higher internal transmittance can be obtained.

Sixth Embodiment

In a sixth embodiment, a nanoparticle-dispersed resin obtained by dispersing two kinds of nanoparticles in a resin is used for the first grating material of the first diffraction grating 2, and an optical glass is used for the second grating material of the second diffraction grating 3. More specifically, a first material used for the first grating material is ITO nanoparticles (nd=1.8289, vd=7.47, and θgF=0.360). A second material is a $TiO_2$ nanoparticles (nd=2.163, vd=20.0, and θgF=0.680). A third material is a thioacrylic ultraviolet curing resin (nd=1.6356, vd=22.7, and θgF=0.689). The first material and the second material are mixed into the third material at 10 volumetric % and 10 volumetric %, respectively. The first grating material is a nanoparticle-dispersed material having those three kinds of materials mixed therein (nd1=1.7253, vd1=17.7, and θgF1=0.593).

The second grating material of the second diffraction grating 3 is an optical glass (nd2=1.8100, vd2=41.0, and θgF2=0.567) selected so that high diffraction efficiency is obtained. The first diffraction grating 2 and the second diffraction grating 3 of the grating portion both have a grating height of 6.27 μm, and constitute the contacting two-layer DOE in which the grating surfaces thereof are in close contact with each other. The design order is set to the +1st order.

Figure 9A:
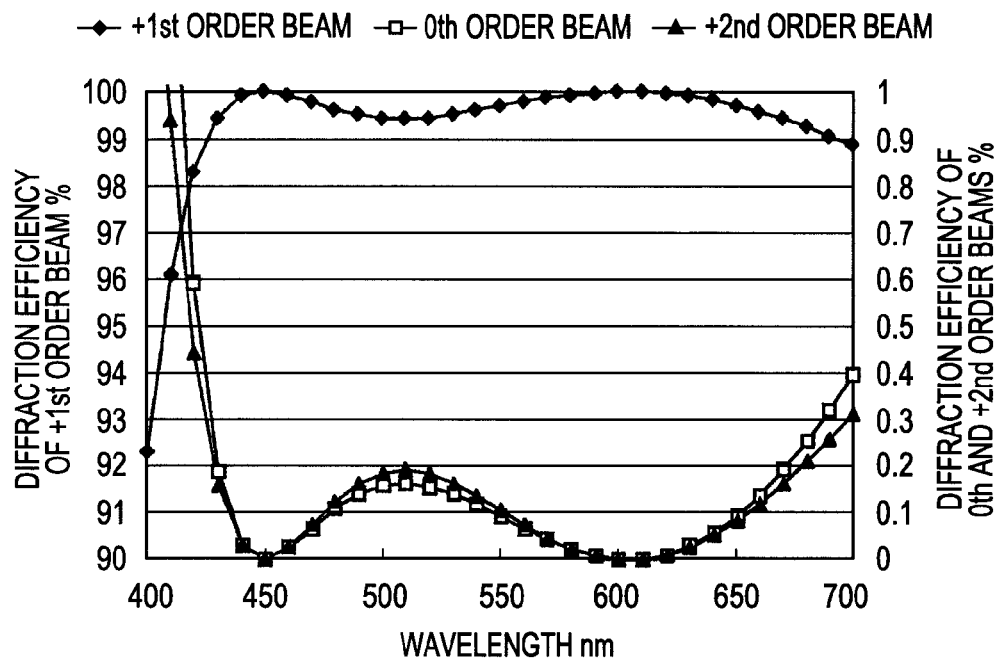
FIG. 9A is a graph of the diffraction efficiency of a diffractive optical portion according to a sixth embodiment.
Figure 9B:
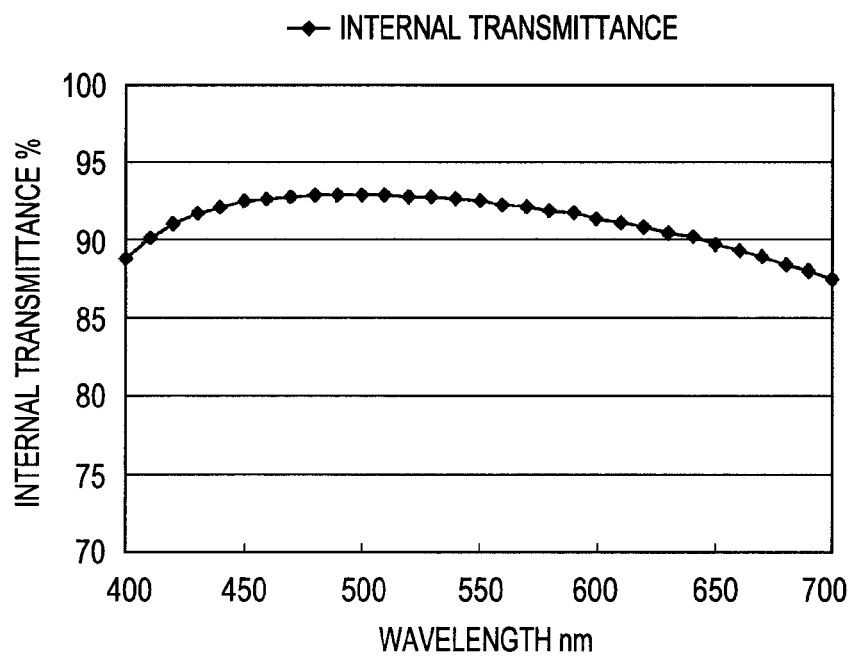
FIG. 9B is a graph of the internal transmittance of the diffractive optical portion according to the sixth embodiment.

FIG. 9A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.4%, and at the same time, flare generated by unnecessary orders is suppressed to equal to or smaller than 0.2%. FIG. 9B shows a characteristic of internal transmittance of the diffraction grating portion. A thickness h2 of the grating base portion 2a of the first diffraction grating 2 of the sixth embodiment is 5 μm. As can be seen from FIG. 9B, the internal transmittance of the diffraction grating portion of the sixth embodiment is 91.9% on average in the entire visible range (from the wavelength of 430 nm to the wavelength of 670 nm). This value of transmittance is higher compared to that of a comparison example to be described later.

Comparison Example 3

In Comparison Example 3, the same optical glass as in the sixth embodiment is used for the material of the second diffraction grating, and a nanoparticle-dispersed resin obtained by dispersing only the ITO nanoparticles in a resin is used for the first grating material forming the first diffraction grating 2. More specifically, a thioacrylic ultraviolet curing resin (nd=1.6356, vd=22.7, and θgF=0.689) is used for the first grating material of the first diffraction grating 2. The first grating material is a nanoparticle-dispersed material (nd1=1.6860, vd1=13.6, and θgF1=0.495) obtained by dispersing ITO nanoparticles (nd=1.8289, vd=7.47, and θgF=0.360) in the thioacrylic ultraviolet curing resin at 25 volumetric %. The second grating material of the second diffraction grating 3 is an optical glass (nd2=1.8100, vd2=41.0, and θgF2=0.567) selected so that high diffraction efficiency is obtained. The first diffraction grating 2 and the second diffraction grating 3 of the grating portion both have a grating height of 4.74 μm, and constitute the contacting two-layer DOE in which the grating surfaces thereof are in close contact with each other. The design order is set to the +1st order.

Figure 14A:
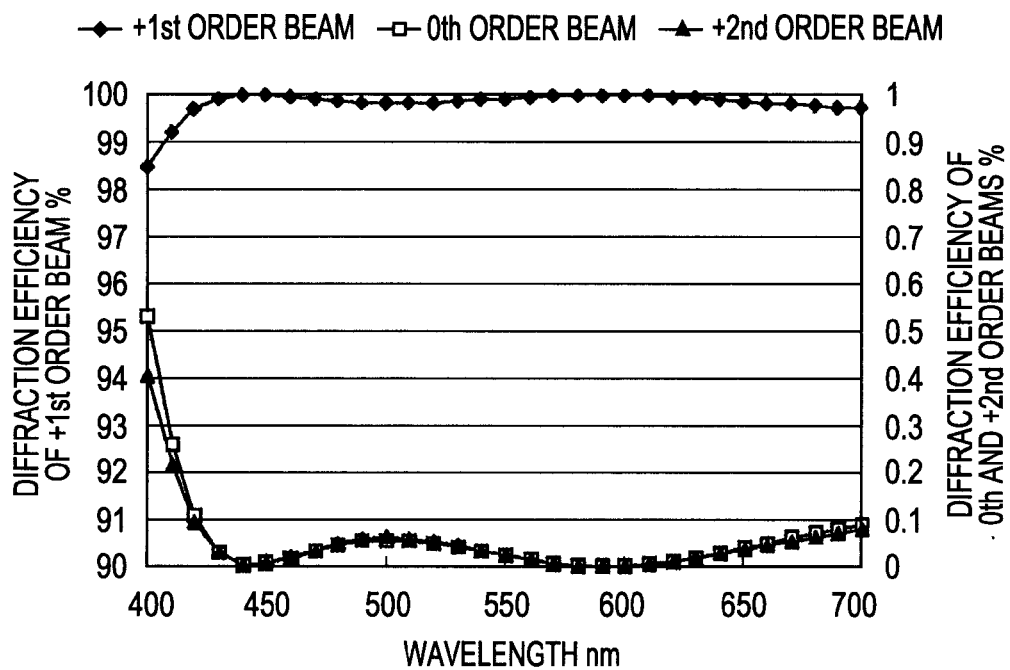
FIG. 14A is a graph of the diffraction efficiency of a diffractive optical portion according to Comparison Example 3.
Figure 14B:
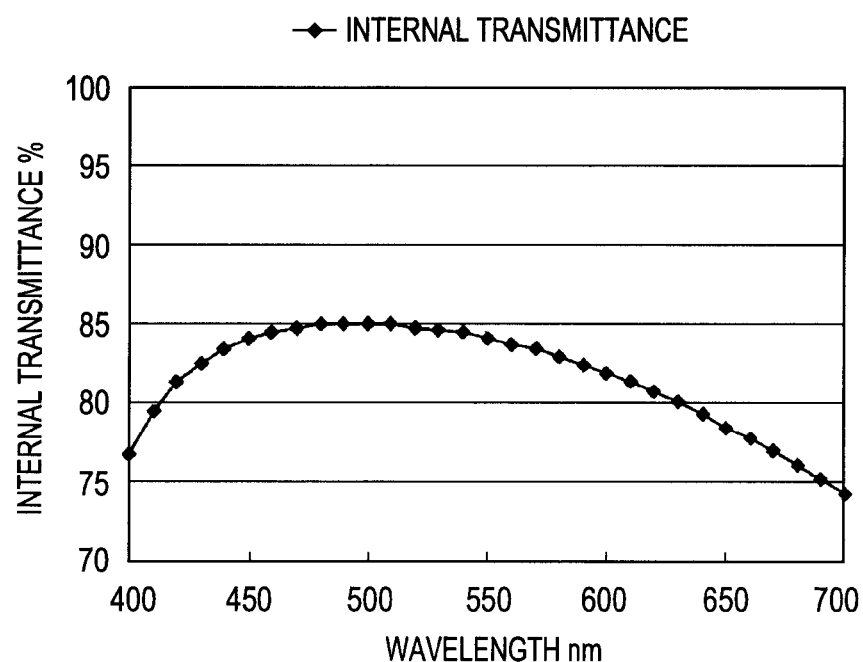
FIG. 14B is a graph of the internal transmittance of the diffractive optical portion according to Comparison Example 3.

FIG. 14A shows characteristics of the diffraction efficiency in the design order (+1st order) and of the diffraction efficiencies in the 0th order and +2nd order of the diffraction grating portion. The incident angle is assumed to be perpendicular to the base surface of the grating. In the entire visible range (from the wavelength of 430 nm to the wavelength of 670 nm), the diffraction efficiency in the design order is equal to or higher than 99.8%, and at the same time, flare generated by unnecessary orders is suppressed to equal to or smaller than 0.1%. FIG. 14B shows a characteristic of internal transmittance of the diffraction grating portion. A thickness h2 of the grating base portion 2a of the first diffraction grating 2 of Comparison Example 3 is 5 μm. As can be seen from FIG. 14B, the internal transmittance of the diffraction grating portion of Comparison Example 3 is 82.6% on average in the entire visible range (from the wavelength of 430 nm to the wavelength of 670 nm).

In Comparison Example 3, the same optical glass as in the sixth embodiment is used for the second grating material of the second diffraction grating 3. However, the mixing ratio of the ITO nanoparticles is higher, resulting in lower internal transmittance compared to the sixth embodiment, which is unfavorable when the diffractive optical element is applied to an optical system which requires high transmittance.

Seventh Embodiment

Figure 10:
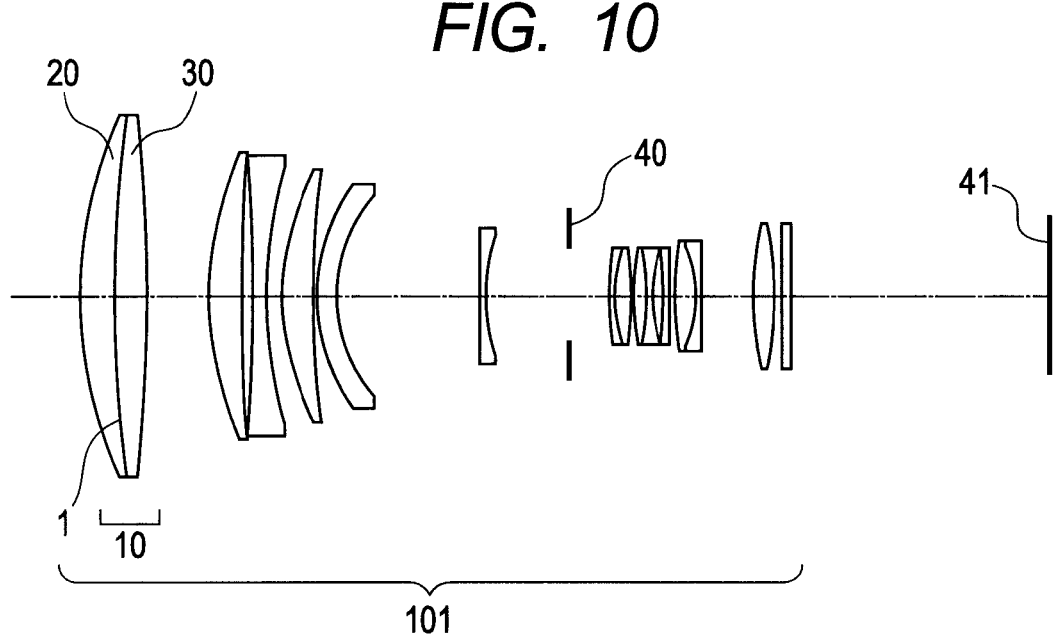
FIG. 10 is an image taking optical system according to a seventh embodiment.

FIG. 10 is a sectional view of a main part of an optical system (image taking lens system) using the diffractive optical element according to a seventh embodiment of the present invention. Referring to FIG. 10, an image taking lens system 101 includes a stop (aperture stop) 40 and the diffractive optical element 10 described above with reference to the respective embodiments of the present invention. At an imaging plane 41, a film or a CCD is disposed. The diffractive optical element 10 is an optical element having a lens function, and corrects chromatic aberration of the image taking lens system 101. Application of the diffractive optical element 10 of the present invention enables achieving high diffraction efficiency, high transmittance, and small grating height. Therefore, a high-performance image taking lens system having less flare and higher transmittance can be obtained. In FIG. 10, the diffractive optical portion 1 is provided between bonded surfaces of a cemented lens including the lens 20 and the lens 30.

This embodiment is not limited thereto, and the diffractive optical element 10 may be provided on a lens surface. Further, multiple diffractive optical elements may be used within the image taking lens system. Further, in this embodiment, the case of the image taking lens system for a camera is described, but the present invention is not limited thereto. The same effects can be obtained as well when the diffractive optical element is employed for optical systems used in a wide wavelength range, such as an image taking lens system for a video camera, an image scanner as office equipment, and a reader lens for a digital copier.

Eighth Embodiment

Figure 11:
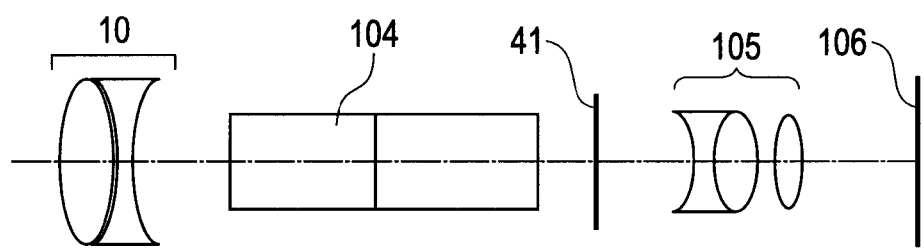
FIG. 11 is an observation optical system according to an eighth embodiment.

FIG. 11 is a sectional view of a main part of an observation optical system using the diffractive optical element, such as a telescope and binoculars, according to an eighth embodiment of the present invention. Referring to FIG. 11, the observation optical system includes an objective lens 10 including the diffractive optical element, a prism 104 serving as image reversing means for erecting an image, an ocular lens 105, and a pupil plane 106. The diffractive optical element 10 is used for the purpose of correcting chromatic aberration and the like at the imaging plane 41 of the objective lens. The application of the diffractive optical element of the present invention enables achieving high diffraction efficiency, high transmittance, and small grating height. Therefore, a high-performance objective lens having less flare and high transmittance can be obtained.

In this embodiment, the case where the diffractive optical element 10 is formed as the objective lens 1 is described, but the present invention is not limited thereto. The same effects can be obtained as well when the diffractive optical element 10 is positioned on a surface of the prism or within the ocular lens. When the diffractive optical element 10 is provided closer to an object side, relative to the imaging plane 41, an effect of reducing chromatic aberration can be obtained with respect only to the objective lens. Therefore, in a case of an observation system which is observed by a naked eye, it is preferred that the diffractive optical element 10 be provided at least on the objective lens side. Further, in this embodiment, the case of the binoculars is described, but the present invention is not limited thereto and may be applied to a terrestrial telescope or a telescope for astronomical observation. Further, the same effects can be obtained for an optical viewfinder of, for example, a lens shutter camera or a video camera. Next, Table 1 shows correspondence relation between each embodiment and the conditional expressions (1) to (12) given above.

TABLE 1

(Table-1)

| Conditional expression | Embodiment | | | | | | Comparison Example | | |
|---|---|---|---|---|---|---|---|---|---|
| | 1 | 2 | 3 | 4 | 5 | 6 | 1 | 2 | 3 |
| nd1 | 1.570 | 1.515 | 1.566 | 1.552 | 1.564 | 1.715 | 1.480 | 1.497 | 1.686 |
| nd2 | 1.617 | 1.567 | 1.629 | 1.621 | 1.621 | 1.810 | 1.524 | 1.550 | 1.810 |
| vd1 | 24.3 | 21.6 | 20.6 | 19.5 | 22.1 | 17.7 | 22.6 | 19.0 | 13.6 |
| vd2 | 48.5 | 49.9 | 48.2 | 48.4 | 48.4 | 41.0 | 51.6 | 50.5 | 41.0 |
| θgF1 | 0.552 | 0.458 | 0.496 | 0.509 | 0.577 | 0.593 | 0.423 | 0.410 | 0.495 |
| θgF2 | 0.583 | 0.574 | 0.585 | 0.584 | 0.584 | 0.567 | 0.563 | 0.570 | 0.567 |
| vd11 | 7.5 | 7.5 | 7.5 | 7.5 | 7.5 | 7.5 | 7.5 | 7.5 | 7.5 |
| vd12 | 20.0 | 20.0 | 20.0 | 60.6 | 60.6 | 20.0 | 60.6 | 60.6 | 22.7 |
| vd13 | 60.6 | 60.6 | 60.6 | 22.7 | 22.7 | 22.7 | — | — | — |
| θgF11 | 0.361 | 0.361 | 0.361 | 0.361 | 0.361 | 0.361 | 0.361 | 0.361 | 0.361 |
| θgF12 | 0.680 | 0.680 | 0.680 | 0.553 | 0.553 | 0.680 | 0.553 | 0.553 | 0.689 |
| θgF13 | 0.553 | 0.553 | 0.553 | 0.689 | 0.689 | 0.689 | — | — | — |
| k11 | 0.005 | 0.005 | 0.005 | 0.005 | 0.005 | 0.005 | 0.005 | 0.005 | 0.005 |
| (3) Right side | 0.636 | 0.645 | 0.649 | 0.653 | 0.644 | 0.660 | 0.642 | 0.655 | 0.677 |
| (4) Right side | 0.447 | 0.434 | 0.429 | 0.424 | 0.436 | 0.415 | 0.438 | 0.421 | 0.395 |
| (5) Right side | 0.158 | 0.287 | 0.335 | 0.386 | 0.266 | 0.474 | 0.243 | 0.412 | 0.667 |
| (7) Right side | 0.743 | 0.743 | 0.743 | 0.743 | 0.743 | 0.743 | 0.743 | 0.743 | 0.743 |
| (9) Right side | 0.621 | 0.621 | 0.621 | 0.527 | 0.527 | 0.621 | 0.527 | 0.527 | 0.611 |
| (10) Right side | 0.527 | 0.527 | 0.527 | 0.611 | 0.611 | 0.611 | — | — | — |
| (11) Left side | 0.544 | 0.542 | 0.545 | 0.544 | 0.544 | 0.559 | 0.539 | 0.541 | 0.559 |
| (11) Right side | 0.594 | 0.592 | 0.595 | 0.594 | 0.594 | 0.609 | 0.589 | 0.591 | 0.609 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-154704, filed Jul. 7, 2010, which is hereby incorporated by reference herein in its entirety.

What is claimed is:

1. A diffractive optical element comprising:
a diffraction grating portion including a first diffraction grating and a second diffraction grating, the first diffraction grating and the second diffraction grating being formed of different materials and being stacked so that grating surfaces thereof are in contact with each other,
wherein the first diffraction grating is formed of a first grating material having at least three kinds of materials mixed therein, and the following conditions are satisfied:

$nd1 < nd2;$ $vd1 < vd2;$ $\theta gF1 < (-1.665E{-}07 \times vd1^3 + 5.213E{-}05 \times vd1^2 - 5.656E{-}03 \times vd1 + 0.715);$ $\theta gF1 > (+4.80E{-}03 \times vd1 + 0.33);$ and $\theta gF1 > (-4.73E{-}02 \times vd1 + 1.31),$ where nd1, vd1, and θgF1 represent a refractive index, an Abbe number, and a partial dispersion ratio, respectively, of the first grating material with respect to a d-line, and nd2 and vd2 represent a refractive index and an Abbe number, respectively, of a second grating material forming the second diffraction grating with respect to the d-line.

2. A diffractive optical element according to claim 1, wherein the Abbe number of the first grating material is equal to or smaller than 30.

3. A diffractive optical element according to claim 1, wherein the first grating material has ITO nanoparticles mixed therein as a material.

4. A diffractive optical element according to claim 1, wherein the first grating material has at least two different kinds of nanoparticles mixed therein as materials.

5. A diffractive optical element according to claim 1, wherein the first grating material has nanoparticles including an inorganic oxide mixed therein as a material.

6. A diffractive optical element according to claim 1, wherein the first grating material has $TiO_2$ nanoparticles mixed therein as a material.

7. A diffractive optical element according to claim 1, wherein the first grating material has a resin mixed therein as a material, the resin obtained by mixing at least two different kinds of resins with each other.

8. A diffractive optical element according to claim 1, wherein the following condition is satisfied:

$(-1.665E{-}07 \times vd2^3 + 5.213E{-}05 \times vd2^2 - 5.656E{-}03 \times vd2 + 0.715) < \theta gF2 < (-1.665E{-}07 \times vd2^3 + 5.213E{-}05 \times vd2^2 - 5.656E{-}03 \times vd2 + 0.765),$ where vd2 and θgF2 represent an Abbe number and a partial dispersion ratio, respectively, of the second grating material forming the second diffraction grating.

9. A diffractive optical element according to claim 1, wherein the following condition is satisfied:

$0.945 \leq (n2(\lambda) - n1(\lambda))d/(m\lambda) \leq 1.055,$ where n1(λ) represents a refractive index of the first grating material at a wavelength of λ, n2(λ) represents a refractive index of the second grating material at the wavelength of λ, d represents a grating height of the diffraction grating portion, and m represents a diffractive order.

10. A diffractive optical element comprising:
a diffraction grating portion including a first diffraction grating and a second diffraction grating, the first diffraction grating and the second diffraction grating being formed of different materials and being stacked so that grating surfaces thereof are in contact with each other,
wherein the first diffraction grating is formed of a first grating material having at least three kinds of materials mixed therein, and the following conditions are satisfied:

$k11 > 0.001;$ $\theta gF11 < (-1.665E{-}07 \times vd11^3 + 5.213E{-}05 \times vd11^2 - 5.656E{-}03 \times vd11 + 0.500);$ $vd12 < 30;$ and $\theta gF12 > (-1.665E{-}07 \times vd12^3 + 5.213E{-}05 \times vd12^2 - 5.656E{-}03 \times vd12 + 0.715),$ where k11, vd11, and θgF11 represent an extinction coefficient, an Abbe number, and a partial dispersion ratio, respectively, of a first material used in the first grating material, and vd12 and θgF12 represent an Abbe number and a partial dispersion ratio, respectively, of a second material used in the first grating material.

11. A diffractive optical element according to claim 10, wherein the following condition is satisfied:

$\theta gF13 > (-1.665E{-}07 \times vd13^3 + 5.213E{-}05 \times vd13^2 - 5.656E{-}03 \times vd13 + 0.715),$ where vd13 and θgF13 represent an Abbe number and a partial dispersion ratio, respectively, of a third material used in the first grating material, the third material being different from the second material.

12. A diffractive optical element according to claim 10, wherein the first grating material has ITO nanoparticles mixed therein as a material.

13. A diffractive optical element according to claim 10, wherein the first grating material has at least two different kinds of nanoparticles mixed therein as materials.

14. A diffractive optical element according to claim 10, wherein the first grating material has nanoparticles including an inorganic oxide mixed therein as a material.

15. A diffractive optical element according to claim 10, wherein the first grating material has $TiO_2$ nanoparticles mixed therein as a material.

16. A diffractive optical element according to claim 10, wherein the first grating material has a resin mixed therein as a material, the resin obtained by mixing at least two different kinds of resins with each other.

17. A diffractive optical element according to claim 10, wherein the following condition is satisfied:

$(-1.665E{-}07 \times vd2^3 + 5.213E{-}05 \times vd2^2 - 5.656E{-}03 \times vd2 + 0.715) < \theta gF2 < (-1.665E{-}07 \times vd2^3 + 5.213E{-}05 \times vd2^2 - 5.656E{-}03 \times vd2 + 0.765),$ where vd2 and θgF2 represent an Abbe number and a partial dispersion ratio, respectively, of the second grating material forming the second diffraction grating.

18. A diffractive optical element according to claim 10, wherein the following condition is satisfied:

$0.945 \leq (n2(\lambda) - n1(\lambda))d/(m\lambda) \leq 1.055,$ where n1(λ) represents a refractive index of the first grating material at a wavelength of λ, n2(λ) represents a refractive index of the second grating material at the wavelength of λ, d represents a grating height of the diffraction grating portion, and m represents a diffractive order.

19. An optical system having a diffractive optical element comprising:

a diffraction grating portion including a first diffraction grating and a second diffraction grating, the first diffraction grating and the second diffraction grating being formed of different materials and being stacked so that grating surfaces thereof are in contact with each other, wherein the first diffraction grating is formed of a first grating material having at least three kinds of materials mixed therein, and the following conditions are satisfied:

$nd1 < nd2;$ $vd1 < vd2;$ $\theta gF1 < (-1.665E-07 \times vd1^3 + 5.213E-05 \times vd1^2 - 5.656E-03 \times vd1 + 0.715);$ $\theta gF1 > (+4.80E-03 \times vd1 + 0.33);$ and $\theta gF1 > (-4.73E-02 \times vd1 + 1.31),$ where nd1, vd1, and θgF1 represent a refractive index, an Abbe number, and a partial dispersion ratio, respectively, of the first grating material with respect to a d-line, and nd2 and vd2 represent a refractive index and an Abbe number, respectively, of a second grating material forming the second diffraction grating with respect to the d-line.

20. An optical system having diffractive optical element comprising:

a diffraction grating portion including a first diffraction grating and a second diffraction grating, the first diffraction grating and the second diffraction grating being formed of different materials and being stacked so that grating surfaces thereof are in contact with each other, wherein the first diffraction grating is formed of a first grating material having at least three kinds of materials mixed therein, and the following conditions are satisfied:

$k11 > 0.001;$ $\theta gF11 < (-1.665E-07 \times vd11^3 + 5.213E-05 \times vd11^2 - 5.656E-03 \times vd11 + 0.500);$ $vd12 < 30;$ and $\theta gF12 > (-1.665E-07 \times vd12^3 + 5.213E-05 \times vd12^2 - 5.656E-03 \times vd12 + 0.715),$ where k11, vd11, and θgF11 represent an extinction coefficient, an Abbe number, and a partial dispersion ratio, respectively, of a first material used in the first grating material, and vd12 and θgF12 represent an Abbe number and a partial dispersion ratio, respectively, of a second material used in the first grating material.

* * * * *